US008161244B2

(12) United States Patent
Krishnaprasad et al.

(10) Patent No.: US 8,161,244 B2
(45) Date of Patent: Apr. 17, 2012

(54) MULTIPLE CACHE DIRECTORIES

(75) Inventors: Muralidhar Krishnaprasad, Redmond, WA (US); Sudhir Mohan Jorwekar, Hyderabad (IN); Sharique Muhammed, Hyderabad (IN); Subramanian Muralidhar, Bellevue, WA (US); Anil K. Nori, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/464,898

(22) Filed: May 13, 2009

(65) Prior Publication Data
US 2010/0293333 A1 Nov. 18, 2010

(51) Int. Cl.
*G06F 12/00* (2006.01)

(52) U.S. Cl. ......... 711/136; 711/141; 711/133; 711/121

(58) Field of Classification Search .......... 711/121–124, 711/141, 133, 144; 707/609, 694–695, 828; 709/212–216
See application file for complete search history.

(56) References Cited

U.S. PATENT DOCUMENTS

| | | |
|---|---|---|
| 4,694,404 A | 9/1987 | Meagher |
| 5,634,053 A | 5/1997 | Noble et al. |
| 5,671,416 A | 9/1997 | Elson |
| 5,924,096 A | 7/1999 | Draper et al. |
| 6,341,311 B1 | 1/2002 | Smith et al. |
| 6,360,220 B1 | 3/2002 | Forin |
| 6,453,404 B1 | 9/2002 | Bereznyi et al. |
| 6,460,122 B1 | 10/2002 | Otterness et al. |
| 6,701,393 B1 | 3/2004 | Kemeny et al. |
| 6,754,662 B1 * | 6/2004 | Li .................................. 707/693 |
| 6,901,410 B2 | 5/2005 | Marron et al. |
| 6,950,823 B2 | 9/2005 | Amiri et al. |
| 6,970,975 B2 | 11/2005 | Frank |
| 6,973,546 B2 | 12/2005 | Johnson |
| 7,058,639 B1 | 6/2006 | Chatterjee et al. |
| 7,149,730 B2 | 12/2006 | Mullins et al. |
| 7,822,927 B1 * | 10/2010 | Scheer ......................... 711/133 |
| 7,984,088 B2 * | 7/2011 | Delorme et al. ............. 707/828 |
| 2003/0014593 A1 | 1/2003 | Arimilli et al. |
| 2003/0163644 A1 | 8/2003 | Hoang et al. |
| 2004/0098539 A1 | 5/2004 | Frank |
| 2004/0111486 A1 | 6/2004 | Schuh et al. |

(Continued)

OTHER PUBLICATIONS

Iyer, et al., "Squirrel: A Decentralized PeertoPeer Web Cache", retrieved at <<http://research.microsoft.com/en-us/um/people/antr/past/squirrel.pdf>>, 21th ACM Symposium on Principles of Distributed Computing (PODC 2002), pp. 10.

(Continued)

*Primary Examiner* — David Lam
(74) *Attorney, Agent, or Firm* — Jared S. Goff

(57) ABSTRACT

A first portion of an identifier can be used to assign the identifier to a slot in a first directory. The identifier can identify a cache unit in a cache. It can be determined whether assignment of the identifier to the slot in the first directory will result in the identifier and one or more other identifiers being assigned to the same slot in the first directory. If so, then the technique can include (1) using a second portion of the identifier to assign the identifier to a slot in a second directory; and (2) assigning the one or more other identifiers to one or more slots in the second directory. In addition, it can be determined whether a directory in a cache lookup data structure includes more than one pointer. If not, then a parent pointer that points to the subject directory can be removed.

20 Claims, 26 Drawing Sheets

U.S. PATENT DOCUMENTS

| | | |
|---|---|---|
| 2005/0289551 A1 | 12/2005 | Wojtkiewicz et al. |
| 2006/0143399 A1 | 6/2006 | Petev et al. |
| 2007/0005499 A1 | 1/2007 | Gentry et al. |
| 2007/0198478 A1 | 8/2007 | Yu et al. |
| 2009/0063466 A1 | 3/2009 | Xu et al. |
| 2010/0293332 A1 | 11/2010 | Krishnaprasad et al. |
| 2010/0293338 A1 | 11/2010 | Krishnaprasad et al. |

OTHER PUBLICATIONS

Yang, Jiong; Nittel, Sylvia; Wang, Wei; Muntz, Richard. "DynamO: Dynamic Objects with Persistent Storage," Department of Computer Science, University of California, Los Angeles, California. Retrieved online at <<http://www.cs.unc.edu/~weiwang/paper/pos98.ps>> on Jul. 21, 2008.

Microsoft Project Codename "Velocity," retrieved online at <<http://download.microsoft.com/download/a/1/5/a156ef5b-5613-4e4c-8d0a-33c9151bbef5/Microsoft_Project_Velocity_Datasheet_.pdf>> on Jul. 21, 2008.

Berardi, Nick. "Posts Tagged 'Distributed Cache'," The Coder Journal, retrieved online at <<http://www.coderjournal.com/tags/distributed-cache/>> on Jul. 22, 2008.

Decoro, Christopher; Langston, Harper; Weinberger, Jeremy. "Cash: Distributed Cooperative Buffer Caching," Courant Institute of Mathematical Sciences, New York University. Retrieved online at <<http://cs.nyu.edu/~harper/papers/cash.pdf>> on Jul. 21, 2008.

Krishnaprasad, et al. "Distributed Cache Arrangement", Matter no 324850.02, U.S. Appl. No. 12/363,505, filed Jan. 30, 2009, pp. 25.

Office Action, U.S. Appl. No. 12/468,871, filed May 20, 2009, Notification Date: Jun. 23, 2011, pp. 18.

Office Action, U.S. Appl. No. 12/468,871, filed May 20, 2009, Notification Date: Jan. 11, 2012, pp. 19.

Office Action, U.S. Appl. No. 12/469,688, filed May 21, 2009, Notification Date: Jun. 23, 2011, pp. 21.

* cited by examiner

US 8,161,244 B2

MULTIPLE CACHE DIRECTORIES

BACKGROUND

A continuing problem in computer systems remains handling the growing amount of available information or data. The sheer amount of information being stored on disks or other storage media for databases in some form has been increasing dramatically. While files and disks were measured in thousands of bytes a few decades ago—at that time being millions of bytes (megabytes), followed by billions of bytes (gigabytes)—now databases of a million megabytes (terabytes) and even billions of megabytes are being created and employed in day-to-day activities.

With the costs of memory going down, considerably large caches can be configured on the desktop and server machines. In addition, in a world where hundreds of gigabytes of storage is the norm, the ability to work with most data in large caches can increase productivity and efficiency because the caches can be configured to retrieve data more quickly than the same data can be retrieved from many mass data stores. A cache is a collection of data that duplicates original value(s) stored elsewhere or computed earlier, where the cached data can be read from the cache in lieu of reading the original value(s). A cache is typically implemented where it is more efficient to read the cached data than to read the original value(s) so that use of the cache can increase the overall efficiency of computing systems.

In an effort to scale the size of caches in an organized manner, some caches are configured as distributed partitioned caches. A distributed cache is a cache that is distributed across one or more cache nodes. Typically, a distributed cache is distributed across one or more physical or virtual computing machines. A distributed partitioned cache is a cache that is partitioned across multiple cache nodes, where a primary location for each partition is on a single cache node. As used herein, a cache node refers to a storage process in a cache system. A cache node may be on a single machine or spread across multiple physical machines, and a single physical machine may include multiple storage nodes, such as where a single physical machine hosts multiple virtual machine processes. Thus, the distributed partitioned cache is spread over multiple storage processes, so that the entire set of primary data to be read from the cache is not stored on a single process, and typically is not stored on a single machine. As used herein, the term "primary" data indicates the data that is currently set up to be accessed in the cache, such as to be read from the cache, as opposed to secondary or replicated data that is currently being stored as a backup. The primary data may also be replicated from other data outside the data store. For example, in a distributed cache the primary data may be replicated from more authoritative data that is stored in long-term mass storage. The term "primary" is similarly used to refer to a primary region or partition, which is a region or partition currently set up to be accessed, as opposed to a replica of the primary region or partition. The term "primary" can also be used to refer to a primary cache node, which is a cache node that stores the primary data, such as a primary region. Note, however, that a cache node can be a primary node for one set of cache data and a secondary node for another set of cache data. A distributed partitioned cache system is a system that is configured to implement such distributed partitioned caches.

The data manager component in a distributed cache is a component that handles the storage of the data.

SUMMARY

Whatever the advantages of previous cache data management tools and techniques, they have neither recognized the cache data management tools and techniques described and claimed herein, nor the advantages produced by such tools and techniques.

In one embodiment, the tools and techniques can include using a first portion of an identifier to assign the identifier to a slot in a first directory. The identifier can identify a cache unit in a cache. It can be determined whether assignment of the identifier to the slot in the first directory will result in the identifier and one or more other identifiers being assigned to the same slot in the first directory. If so, then the technique can include (1) using a second portion of the identifier to assign the identifier to a slot in a second directory; and (2) assigning the one or more other identifiers to one or more slots in the second directory.

In another embodiment of the tools and techniques, a first portion of a first identifier can be used to assign the first identifier to a slot in a first directory in a cache lookup data structure, and a first portion of a second identifier can be used to assign the second identifier to a slot in the first directory. The first and second identifiers can identify respective first and second cache units in a cache. It can be determined whether the first identifier and the second identifier are assigned to the same slot in the first directory. If so, then a second portion of the first identifier can be used to assign the first identifier to a first slot in a second directory of the cache lookup data structure, and a second portion of the second identifier can be used to assign the second identifier to a second slot in the second directory.

In yet another embodiment of the tools and techniques, a multi-directory data structure can include a root directory and one or more lower directories below the root directory. The directories can each include one or more pointers pointing to another directory or to one or more cache units in a cache, and at least one of the directories can include a pointer pointing to a cache unit in the cache. It can be determined whether one of the directories includes more than one pointer. If not, then a parent pointer pointing to the directory from a parent slot in a parent directory above the subject directory can be removed from the parent slot.

In yet another embodiment of the tools and techniques, a low priority cleanup queue and a high priority cleanup queue can be maintained. The low priority queue can be configured to list low priority removal candidates to be removed from a cache, with the low priority removal candidates being sorted in an order of priority for removal. The high priority queue can be configured to list high priority removal candidates to be removed from the cache. In response to receiving a request for one or more candidates for removal from the cache, one or more high priority removal candidates from the high priority cleanup queue can be returned if the high priority cleanup queue lists any high priority removal candidates. Moreover, if no more high priority removal candidates remain in the high priority cleanup queue, then one or more low priority removal candidates from the low priority cleanup queue can be returned in the order of priority for removal. As an example, the returned removal candidates in this and the next embodiment can be expiration and/or eviction candidates to be removed from the cache.

In yet another embodiment of the tools and techniques, a request for one or more candidates for removal from a cache can be received, and one or more candidates for removal can be returned in response to the request. Returning the candidates can include returning one or more candidates that are identified as being expired, determining when all candidates for removal that are identified as being expired have been returned. Moreover, when all candidates for removal that are identified as being expired have been returned, then returning the candidates can include returning candidates for removal according to a priority policy.

In yet another embodiment of the tools and techniques, a write operation can be performed on an existing cache unit that is pointed to by an existing committed pointer in a cache directory slot. The slot can be latched to prevent other write operations on the cache unit, but one or more read operations on the cache unit can be allowed during the write operation. After the write operation is complete, the slot can be unlatched.

In yet another embodiment of the tools and techniques, a request for cache data can be received at a cache enumerator. The request can include a state object, which can indicate a state of an enumeration of a cache. In response to the request, the enumeration can be continued by using the state object to identify and send cache data.

In yet another embodiment of the tools and techniques, in response to receiving a cache data request, an enumeration of cache units can be performed by traversing a multi-level data structure. The data structure can include internal nodes and object nodes, and the object nodes can correspond to the cache units. An enumeration state stack can be maintained. The state stack can include state nodes and can indicate a current state of the enumeration. The state nodes can correspond to a set of the internal nodes, where the set of internal nodes forms a path from an internal node under traversal in the data structure to an internal root node in the data structure.

In yet another embodiment of the tools and techniques, a cache can include cache units, and a main cache lookup data structure can include location information corresponding to the cache units. A cache index data structure can include a higher level table and a lower level table. The higher level table can have a leaf node pointing to the lower level table, and the lower level table can have a leaf node pointing to one of the cache units. Moreover, the lower level table can be associated with a tag.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
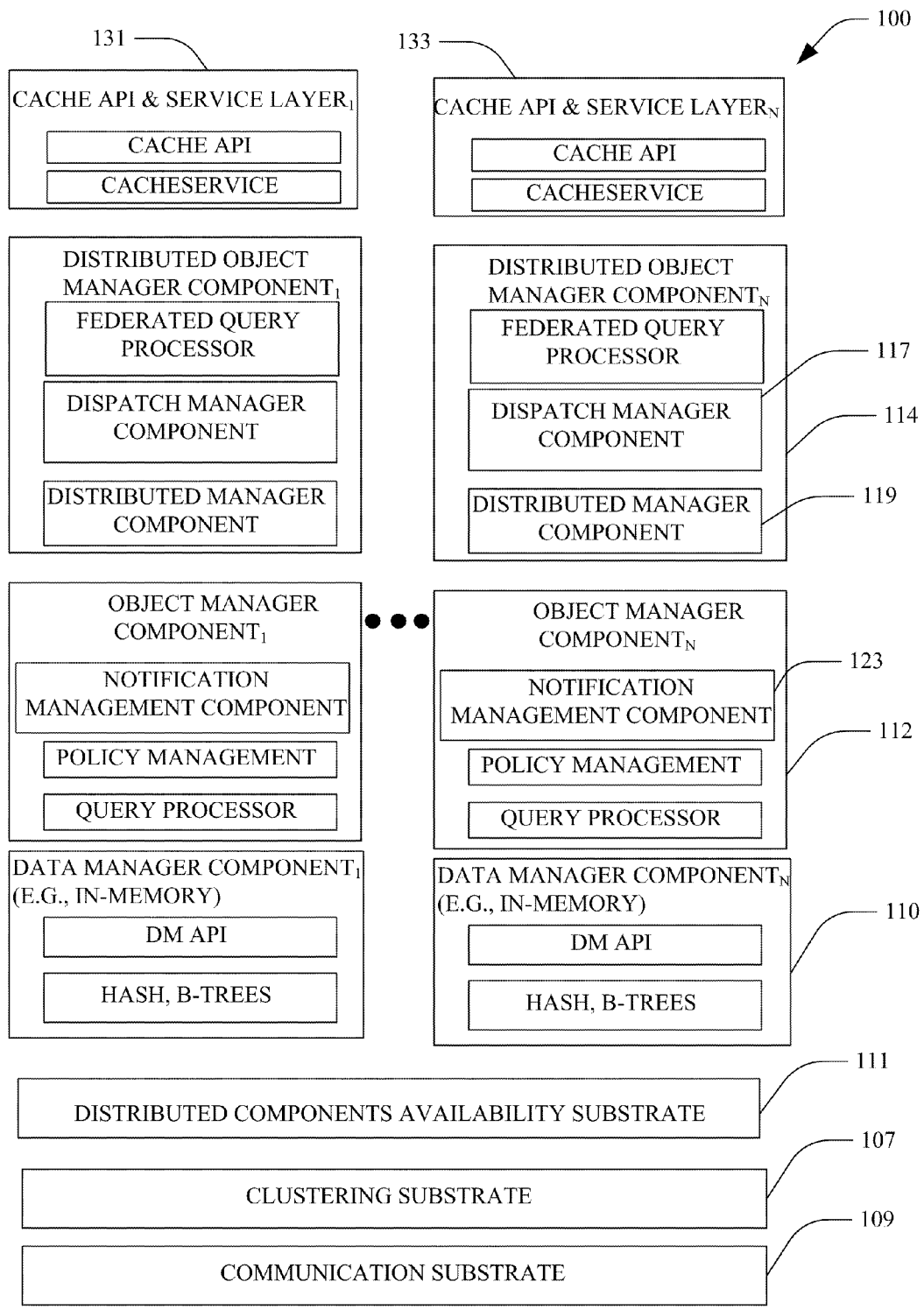
FIG. 1 illustrates an exemplary layering arrangement.

Described embodiments are directed to techniques and tools for improved cache data management. Such improvements may result from the use of various techniques and tools separately or in combination.

Such techniques and tools may include techniques to improve efficiency of data management in a cache. For example, the techniques can include using multiple cache directories, compaction of cache directories, write-only latches, improved eviction and expiration, stateful or stateless enumeration, and multiple table indexing.

As will become apparent in the discussion below, one or more substantial benefits can be realized from the data management tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. General Cache Layering Arrangement

The memory capacity of multiple computers or processes can be aggregated into a single unified cache, which can be scalable (e.g., a dynamic scaling) to a plurality of machines via a layering arrangement. Such layering arrangement can cache serializable Common Language Runtime (CLR) objects and provide access through a simple cache application programming interface (API). The layering arrangement can include a data manager component, an object manager component and a distributed object manager component, which can be implemented in a modular fashion. In one aspect, the data manager component supplies basic data functions (e.g., hash functions), and the object manager component implements object facade thereon including cache objects—while the distributed object manager provides distribution of the data in the distributed cache.

As such, the object manager component can map regions to containers and manage data eviction thresholds and supply policy management for cached data. Such regions can represent cache containers that typically guarantee co-locations of the object placed/inserted in the container (e.g., co-locations of objects in same cache node). Additionally, the object manager component can raise notifications (e.g., due to changes made to cached data) for various regions or objects of the distributed cache. Likewise, the distributed object manager component can dispatch requests to various cache nodes associated with different regions of the distributed cache.

Moreover, the distributed object manager can interface with partition maps, or routing tables, of the distributed cache for a given request, and can facilitate abstraction of the aggregated cache in the distributed environment, to a single unified cache. In one aspect, the distributed object manager component is positioned on top of the object manager component, which itself is placed on top of the data manager component. Moreover, tight integration can be provided with ASP.NET to enable cache ASP.NET session data in the cache without having to write it to source databases, for example.

These components can provide pluggable features that can readily adapt to a user's preferences (e.g., replacing a data manger component with another type thereof, based on user preferences). Likewise, the object manager component can be replaced with another object manager component, wherein plugging different models in the layering arrangement is enabled by enabling a call back mechanism with holding locks during call back throughout the stack.

In a related aspect, the layering arrangement can provide for a modular arrangement that facilitates operation on different levels and communication substrates (e.g., TCP/IP), and which can be implemented in two topology models, namely as an independent separate tier model or an embedded application model. In the independent and separate tier model, the caching layer can function as an independent separate tier by itself (which can be positioned between application servers and data servers). For example, in such a configuration the distributed cache can run as a service hosted either by Windows Activation Services (WAS) or windows service, and can run separate from the application. The applications can either employ the client stubs provided by the distributed cache to talk thereto, or can communicate through a representational state transfer (REST) API directly into the service.

Alternatively, in the embedded application model the cache can be embedded within the application itself (e.g., connecting the applications together to form a cluster—such as embedding caches in ASP.net instances to form a cluster of ASP.net machines, wherein upon storing an item in a local cache it can be viewed from other machines.) This embedding can further enable tagging and Language Integrated Query (LINQ) queries on the objects from a functionality perspective. LINQ queries can then be run natively on stored objects, and can be embedded in .Net applications.

The various aspects of the described tools and techniques will now be described with reference to the annexed drawings, wherein like numerals refer to like or corresponding elements throughout. However, the drawings and detailed description relating thereto are not intended to limit the claimed subject matter to the particular form disclosed. Rather, the intention is to cover all modifications, equivalents and alternatives falling within the spirit and scope of the claimed subject matter. For example, data management may be implemented in an arrangement other than the disclosed cache layering arrangement.

II. Cache System & Tools

A. Cache Layering

FIG. 1 illustrates an exemplary layering arrangement that can enable aggregating memory capacity of multiple computers into a single unified cache. Such layering arrangement (100) can provide for a scalable system that can be tailored to different types of communication layers such as TCP/IP, and pluggable features can be further enabled for readily adapting to a user's preferences. The distributed cache system implementing the layering arrangement (100) can dynamically scale itself with growth of applications associated therewith, by addition of additional computers or storage processes as cache nodes to a cluster of machines and/or storage processes. As illustrated in FIG. 1, each of the cache nodes (131, 133) (1 to n, n being an integer) of the layering arrangement (100) can include a data manager component (110), an object manager component (112) and a distributed object manager component (114), the set up of which can be implemented in a modular fashion. The distributed object manager component (114) can be positioned on top of the object manager component (112), which can be placed on top of the data manager component (110). The data manager component (110) can supply basic data functions (e.g., hash functions), and the object manager component (112) can implement object facade thereon including cache objects, with the distributed object manager component (114) providing the distribution. As such, the object manager component (112) and data manager component (110) can act as local entities, wherein the distributed object manager component (114) can perform distributions.

Moreover, a clustering substrate (107) can establish clustering protocols among a plurality of cache nodes that form a single unified cache. For example, when a cache node is to join or leave the cluster, requisite operations for adding or leaving the cluster can be managed, wherein a distributed components availability substrate (111) can employ such information to manage operations (e.g., monitoring health of cache nodes, managing life cycles of cache nodes, creating a primary cache node on another machine). In addition, for each cache node, each of the components forming the layering arrangement can be pluggable based on user preferences, system features, and the like.

As explained earlier, the data manager component (110) (e.g., in memory) can provide primitive high performance data structures such as hash tables, Btrees, and the like. Since the data manager component (110) can be memory bound and all operations of the distributed cache can be atomic, the data manager component (110) can typically implement highly concurrent hash tables. The data manager component (110) and the hash table structures can further facilitate creating the infrastructure for supplying containers and indexes on containers. In addition, the data manager component (110) can provide simple eviction and expiration on these hash structures. Due to pluggable features supplied by the layering arrangement (100), users can plug in different types of data managers tailored to users' preferences, such as a transaction data manager or a disk paged data manager, or the like. Likewise, the object manager component (112) can provide object abstraction and can implement the concept of named caches and regions by employing data structures provided by the data manager component (110).

Similarly, the distributed object manager component (114) can employ the local object manager component (112) and integrate with the distributed components availability substrate (111) to provide the abstraction of the distributed cache. The distributed components availability substrate (111) can provide the transport and data consistency operations to make the system scalable and available. The distributed object manager component (114) can optionally be implemented as part of a client tier to facilitate dispatching requests (e.g., directly) to the cache nodes associated with the single unified cache.

In one particular aspect, the distributed object manager component (114) can further include a dispatch manager component (117) and a distributed manager component (119). The dispatch manager component (117) can further look up the routing table to dispatch the requests to a primary cache node (e.g., where a primary region is located) as part of a dynamically scalable distributed cache. Moreover, the dispatch manager component (117) can also be present in the client so that the client can directly dispatch requests to the primary cache node. For example, the distributed object manager component (114) on the receiving cache node can interact with a partition map to check if the cache node is indeed designated as the primary cache node as part of a plurality of cache nodes associated with the distributed cache, and can call the object manager component (112) to perform the operation. In the case of write operations, the distributed object manager component (114) can also communicate with a replicator to replicate the data to the secondary cache nodes. The distributed object manager component (114) can also interact with failover manager systems (not shown) to clone regions to create new secondary or primary cache nodes during reconfiguration procedures subsequent to possible failures.

The object manager component (112) can further include a notification management component (123) that can track changes to regions and objects, and can relay notifications to delegates listening to those events. Moreover, applications can also register delegates for notifications on any cache node which may be different from the primary cache node on which the object resides. The distributed object manager component (114) can further manage the propagation of notifications in a distributed fashion including providing high availability for such notifications when the primary cache node fails. For example, this can be handled by maintaining a local lookup table indexed by delegate id on the cache node where the application registers the delegate. The primary cache node that stores the object can maintain the delegate id and the originating cache node information. When an object changes, the distributed object manager component (114) of the primary cache node can notify all the originating cache nodes, passing along the delegate id.

Similarly, the distributed object manager component (114) associated with the receiver can employ the lookup table to call the appropriate delegate, thus providing the change information to the application in a distributed fashion. For example, notifications can be asynchronous and can further be backed up using the same secondary cache nodes. Accordingly, in the event of failures, the secondary cache nodes can attempt to deliver the pending notifications, wherein in the event of primary cache node failure, notifications can be resent because the primary cache node may not have synchronized the information regarding the delivered notifications before failure. Since all notifications can carry the region, key and version information, the application can use the version to ignore duplicate notifications. Following are some examples of callback syntax.

```
Example - Region Level Callback
public delegate CacheCallback
elec_cbk = new CacheCallback( myclass.handler );
catalog.addCallback("ElectronicsRegion", elec_cbk);
Callback called for any updates to region
Example - Object Level Callback
public delegate CacheItemRemovedCallback
elec_cbk = new CacheItemRemovedCallback( );
// Add the callback to the object ; the elec_cbk delegate will be called
// whenever the object changes regardless of where the object is present
catalog.Add("ElectronicsRegion", "key", object, elec_cbk);
```

The availability substrate (111) can provide scalability and availability to systems that contain a storage component associated with the distributed cache. For example, the availability substrate can include load balancers, fail over managers, replicators and the like. A communication substrate (109) can provide for failure detection of cache nodes and reliable message delivery between cache nodes. The communication substrate (109) can interact with the availability substrate (111). Moreover, the communication substrate (109) can also provide the communication channels and cluster management. The communication substrate (109) can provide callbacks whenever a new cache node joins the cluster or when a node dies or fails to respond to exchanged messages (e.g., heart beat messages). Moreover, the communication substrate (109) can provide efficient point-to-point and multicast delivery channels, and can further provide reliable message delivery for implementing replication protocols. For example, the communication substrate (109) can support notifications by maintaining delegate information in cache items and triggering the notification when items are modified. The communication substrate (109) can also trigger eviction based on policies defined at the region or named cache level.

B. Cache Topology

Figure 2:
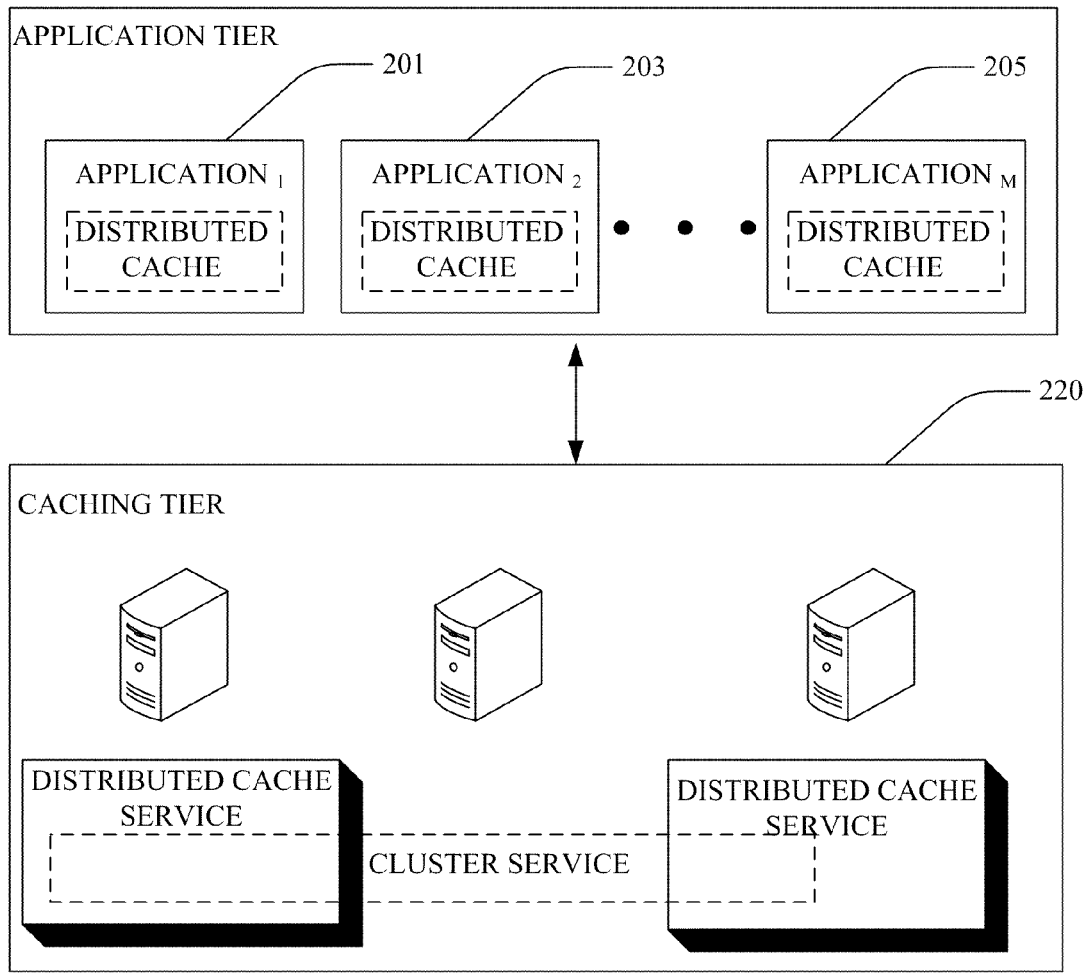
FIG. 2 illustrates a further topology model of a layering arrangement that relates to an independent separate tier model implementation.
Figure 3:
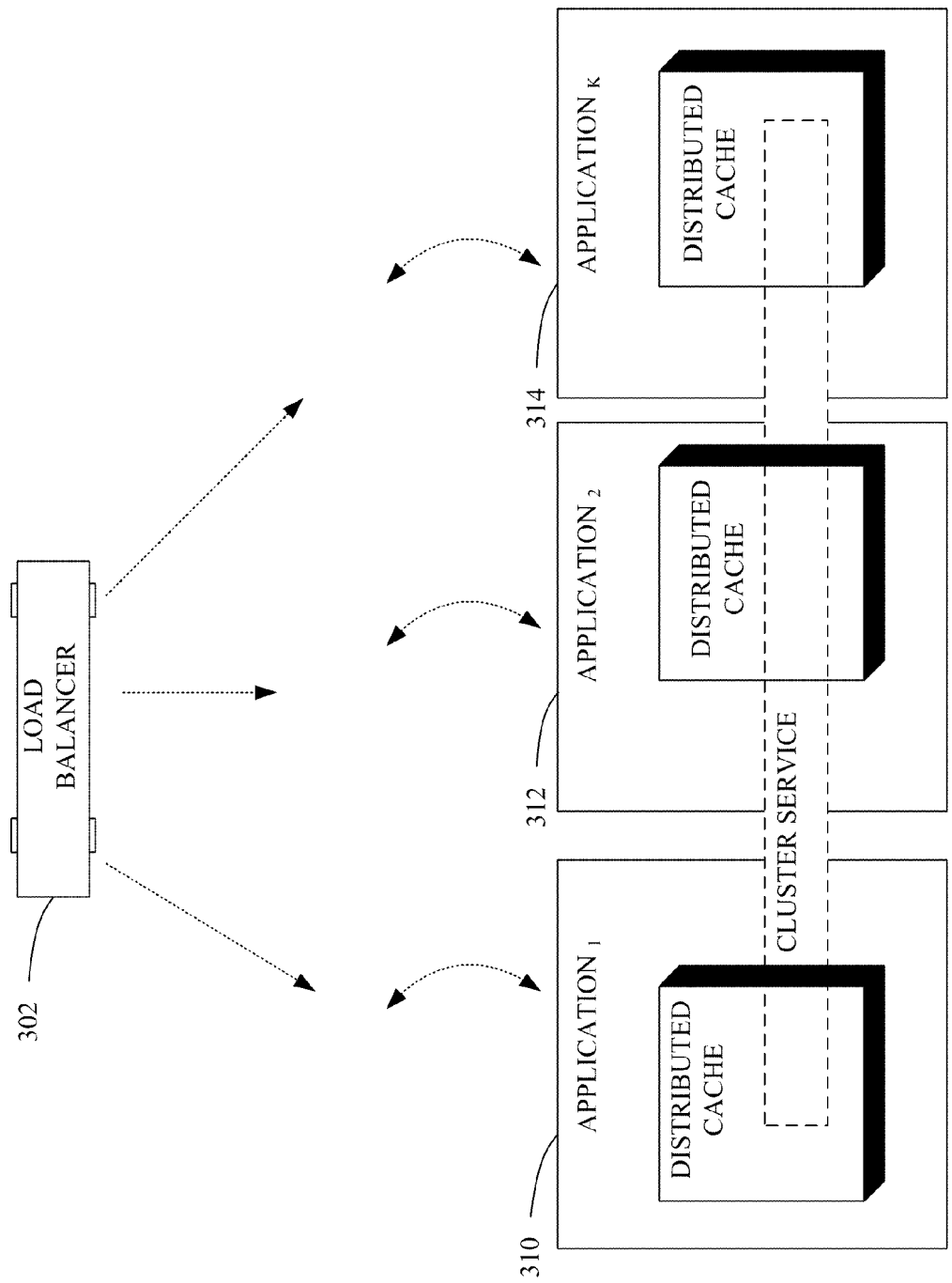
FIG. 3 illustrates a topology model of a layering arrangement that pertains to an embedded application model.

FIG. 2 and FIG. 3 illustrate two topology models, namely an independent separate tier model, and an embedded application model, respectively. According to one particular aspect, in the independent and separate tier model of FIG. 2, the caching tier (220) can function as an independent separate tier by itself (which can be positioned between application servers and data servers). For example, in such configuration the distributed cache system can run as a service hosted either by WAS or windows service and can run separate from the application. The applications (201, 203, 205) (1 to m, m being an integer) can either employ the client stubs provided by the distributed cache to communicate with the cache system, or can communicate directly into the service, such as through a representational state transfer (REST) API.

Alternatively, in the embedded application model the cache system can be embedded within the application itself as illustrated in FIG. 3. Such can occur by connecting the applications (310, 312, 314) (1 to k, k being an integer) together to form a cluster; for instance as embedding caches in ASP.net instances to form a cluster of ASP.net machines, wherein upon storing an item in a local cache it can be viewed from other machines. For example, the distributed cache runtime dlls can be compiled with the application and the application can act as the cache host for the distributed cache runtime. All the thread pools and memory can come from the application's container.

In a related aspect, a Load Balancer (302) can dynamically redistribute load across the cluster in the event that one or more nodes are inundated. For example, data can be repartitioned to spread it to nodes that have less loads. All such nodes can periodically send their load status as part of the configuration metadata. The load balancer (302) can also periodically query the configuration to determine which nodes are overloaded and can be balanced. For example, distributing the load may include repartitioning the overloaded partition of data on a primary node and spreading the overloaded partition to one (or more) of its secondary nodes. This may involve only a change in the configuration data (partition map) and no data movement (since the secondary nodes already have the data). In other scenarios, the data may be distributed to other non-secondary nodes since the secondary nodes themselves might be loaded and cannot handle the additional load. In such cases, either the data partitions on the secondary nodes (for which this node is the primary) can be further load balanced; or non-secondary nodes can be chosen to distribute the load, in which case in addition to the changes in the partition map, data can be moved.

C. Distributed Cache Structure

Figure 4:
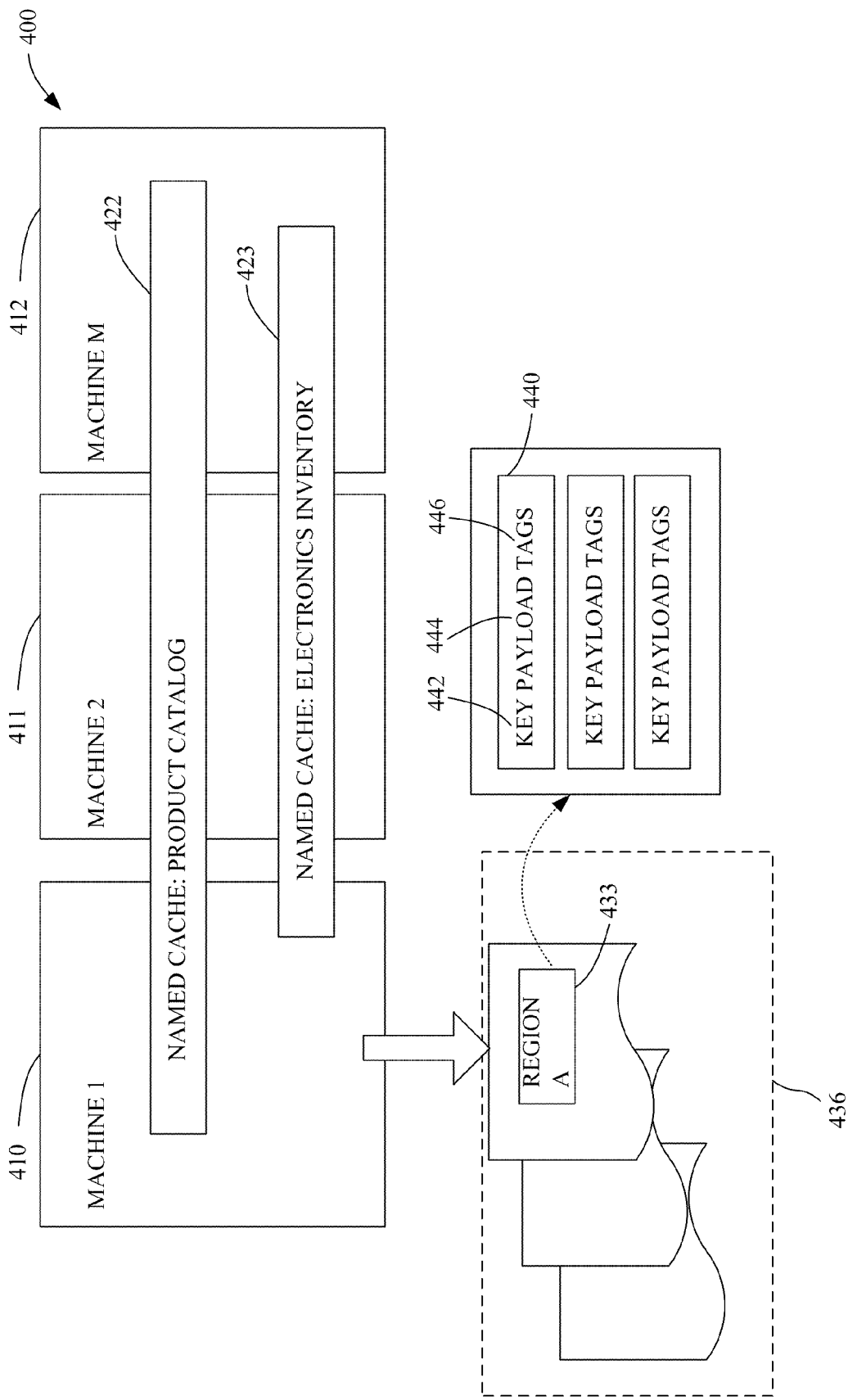
FIG. 4 illustrates a distributed cache that includes a runtime deployed on multiple machines.

FIG. 4 illustrates a distributed cache system (400) that includes the runtime deployed on multiple machines (410, 411, 412) (1 to m, m being an integer) that form a cluster. On each machine (410, 411, 412) there can exist one or more runtimes also referred to as cache hosts. Each cache host (422, 423) can host one or more named caches. The named caches can be configured in the distributed cache configuration file. Moreover, the named caches can be spread around all or a subset of the machines (410, 411, 412) in the cluster. In addition, one or more regions (433) can exist within each named cache. Such regions can be implicitly created by the distributed cache or can be explicitly defined by the application. In general, all items in a region (433) can be guaranteed to be co-located on a cache host, such as by assigning one or more regions (433) to a single partition (436), rather than spreading regions across multiple partitions. Such can improve performance for operations that operate on multiple items in the region, such as query and other set operations. Moreover, the node where a region is located can be deemed as the primary node of that region, wherein typically access to this region will be routed to the primary node for that region. If the named cache is configured to have "backups" for high availability, then one or more other nodes can be chosen to contain a copy of this data. Such nodes are called secondary nodes for that region. All changes made to the primary node can also be reflected on these secondary nodes. Thus if the primary node for a region fails, the secondary node can be used to retrieve the data without having to have logs written to disk.

The following is a code example that shows the creation of a named cache and region.

```
// CacheFactory class provides methods to return cache objects
// Create instance of cachefactory (reads appconfig)
DataCacheFactory fac = new DataCacheFactory( );
// Get a named cache from the factory
DataCache catalog = fac.GetCache("catalogcache");
//---------------------------------------------------------
// Simple Get/Put
catalog.Put("toy-101", new Toy("thomas", .,.));
// From the same or a different client
Toy toyObj = (Toy)catalog.Get("toy-101");
// ---------------------------------------------------------
// Region based Get/Put
catalog.CreateRegion("toyRegion");
// Both toy and toyparts are put in the same region
catalog.Put( "toy-101", new Toy( .,.), "toyRegion");
catalog.Put( "toypart-100", new ToyParts(...), "toyRegion");
Toy toyObj = (Toy)catalog.Get("toy-101", "toyRegion");
```

Each cache region (433) can include one or more cache items (440). Each cache item can include an identifier such as a key (442), a value or payload (444), and one or more tags (446). Cache regions may also be nested so that a cache region may include one or more other cache regions (433) and/or one or more cache items (440).

III. Unified Cache System

Figure 5:
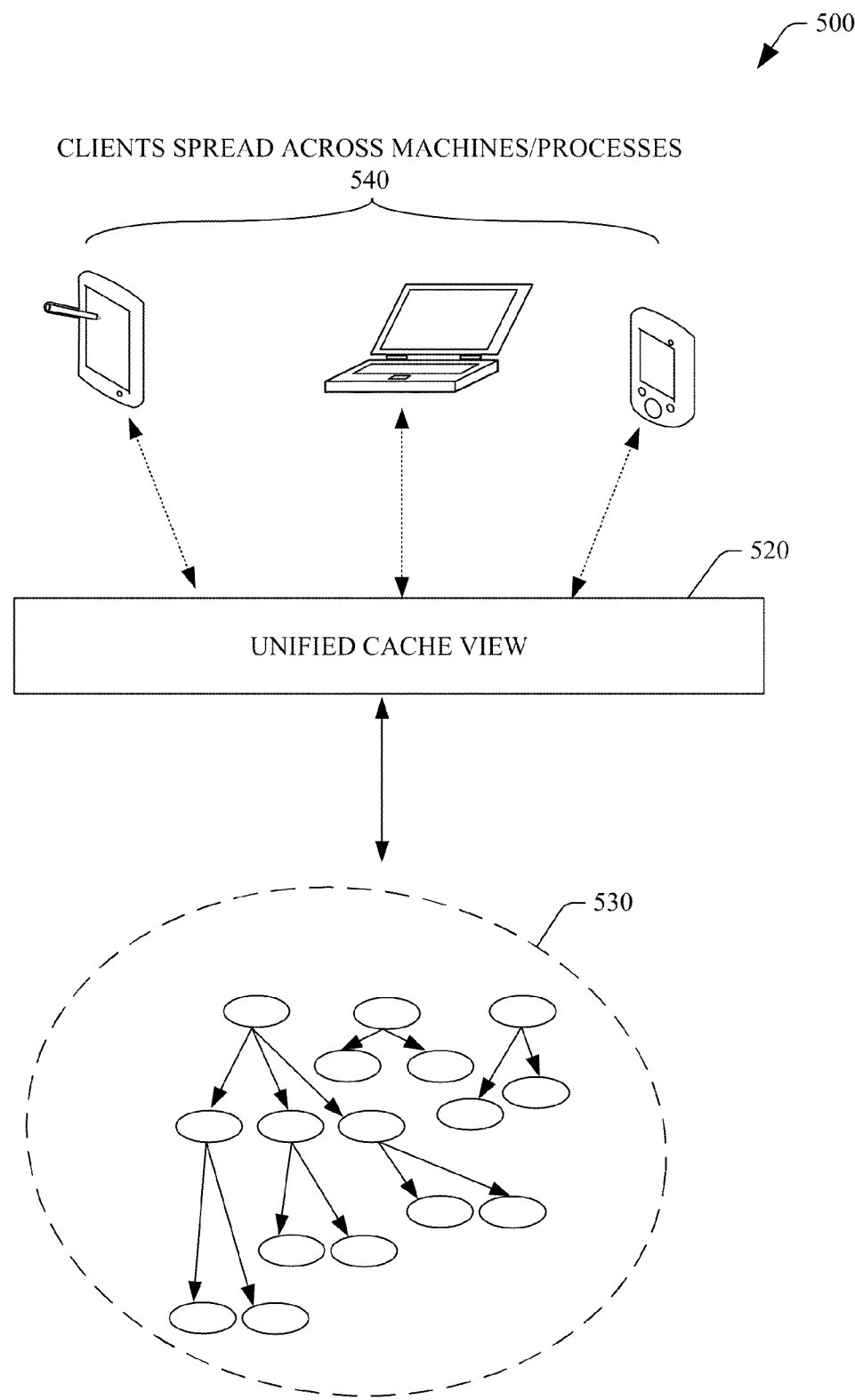
FIG. 5 illustrates an exemplary illustration of a unified cache view.

FIG. 5 illustrates a cache system (500) that can provide a unified cache view (520) of one or more caches (530) for clients (540) spread across machines and/or processes. A cache system (500) including this unified cache view (520) can provide an explicit, distributed, in-memory application cache for all kinds of data with consistency and query. Such data can reside in different tiers (in different service boundaries) with different semantics. For example, data stored in the backend database can be authoritative and can make it desirable to have a high degree of data consistency and integrity. Typically, there tends to be a single authoritative source for any data instance. Most data in the mid-tier, being operated by the business logic tends to be a copy of the authoritative data. Such copies are typically suitable for caching.

IV. Distributed Cache with Artificial Intelligence Component

Figure 6:
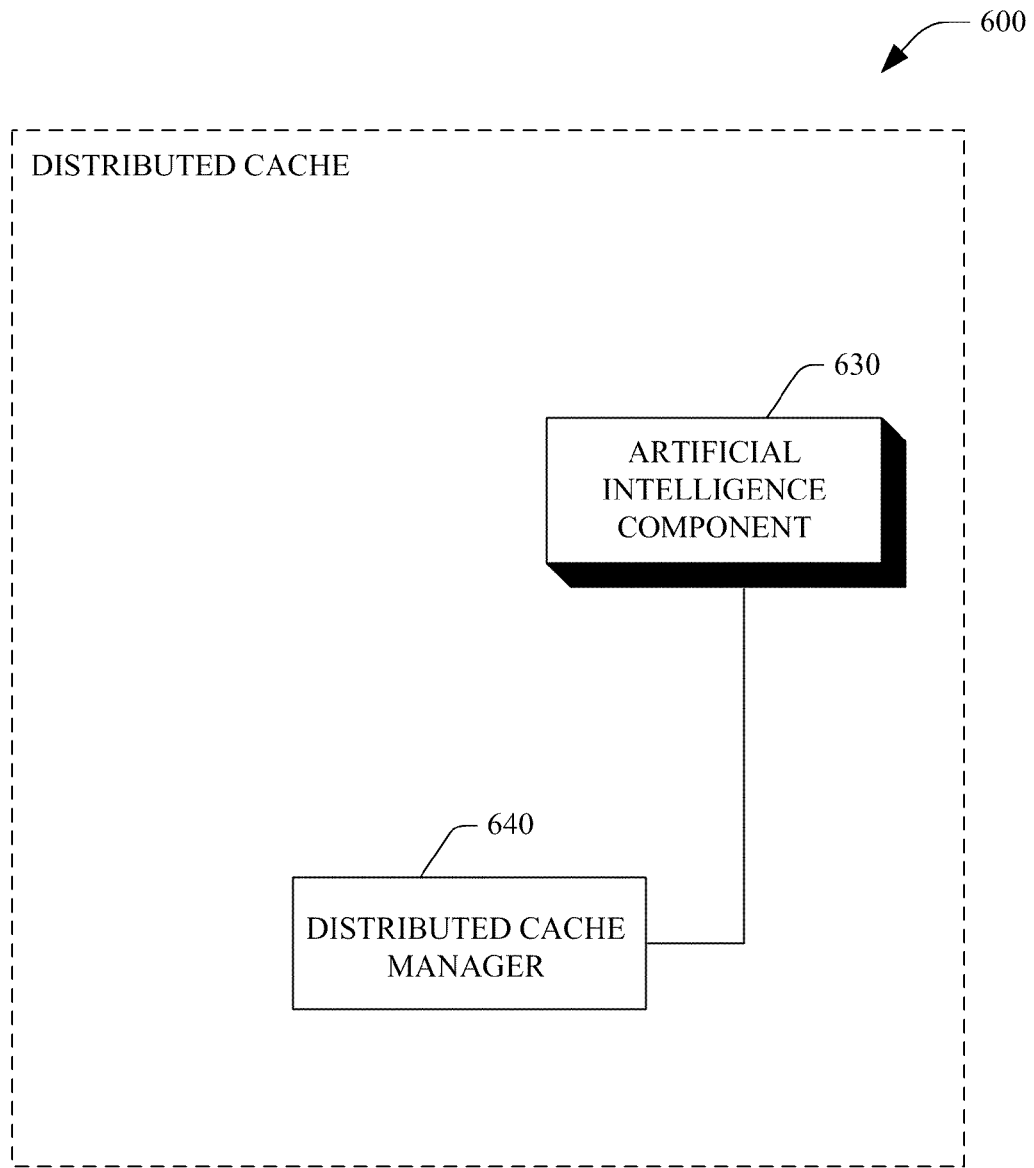
FIG. 6 illustrates an artificial intelligence (AI) component that can be employed to facilitate inferring and/or determining when, where, and/or how to cache data in a distributed environment.

FIG. 6 illustrates an artificial intelligence (AI) component (630) that can be employed in a distributed cache (600) to facilitate inferring and/or determining when, where, and/or how to scale the distributed cache and/or distribute application data therebetween. For example, such artificial intelligence component (630) can supply additional analysis with the distributed cache manager (640) to improve distribution and/or scaling of the system. As used herein, the term "inference" refers generally to the process of reasoning about or inferring states of the system, environment, and/or user from a set of observations, as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component (630) can employ any of a variety of suitable AI-based schemes as described supra in connection with facilitating various aspects of the herein described tools and techniques. For example, a process for learning explicitly or implicitly how or what candidates are of interest, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, classifiers can be explicitly trained (e.g., via a generic training data) as well as implicitly trained (e.g., via observing user behavior, receiving extrinsic information) so that the classifier can be used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$. Moreover, a rule based mechanism can further be employed for interaction of a routing manager and a routing layer associated therewith (e.g., load balancing, memory allocation and the like).

V. Suitable Computing Environment

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or a portion thereof in any manner. It is to be appreciated that a myriad of additional or alternate examples could have been presented, but have been omitted for purposes of brevity.

Furthermore, all or portions of the described tools and techniques can be implemented as a system, method, apparatus, or article of manufacture using standard programming and/or engineering techniques to produce software, firmware, hardware or any combination thereof to control a computer to implement the disclosed tools and techniques. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 7:
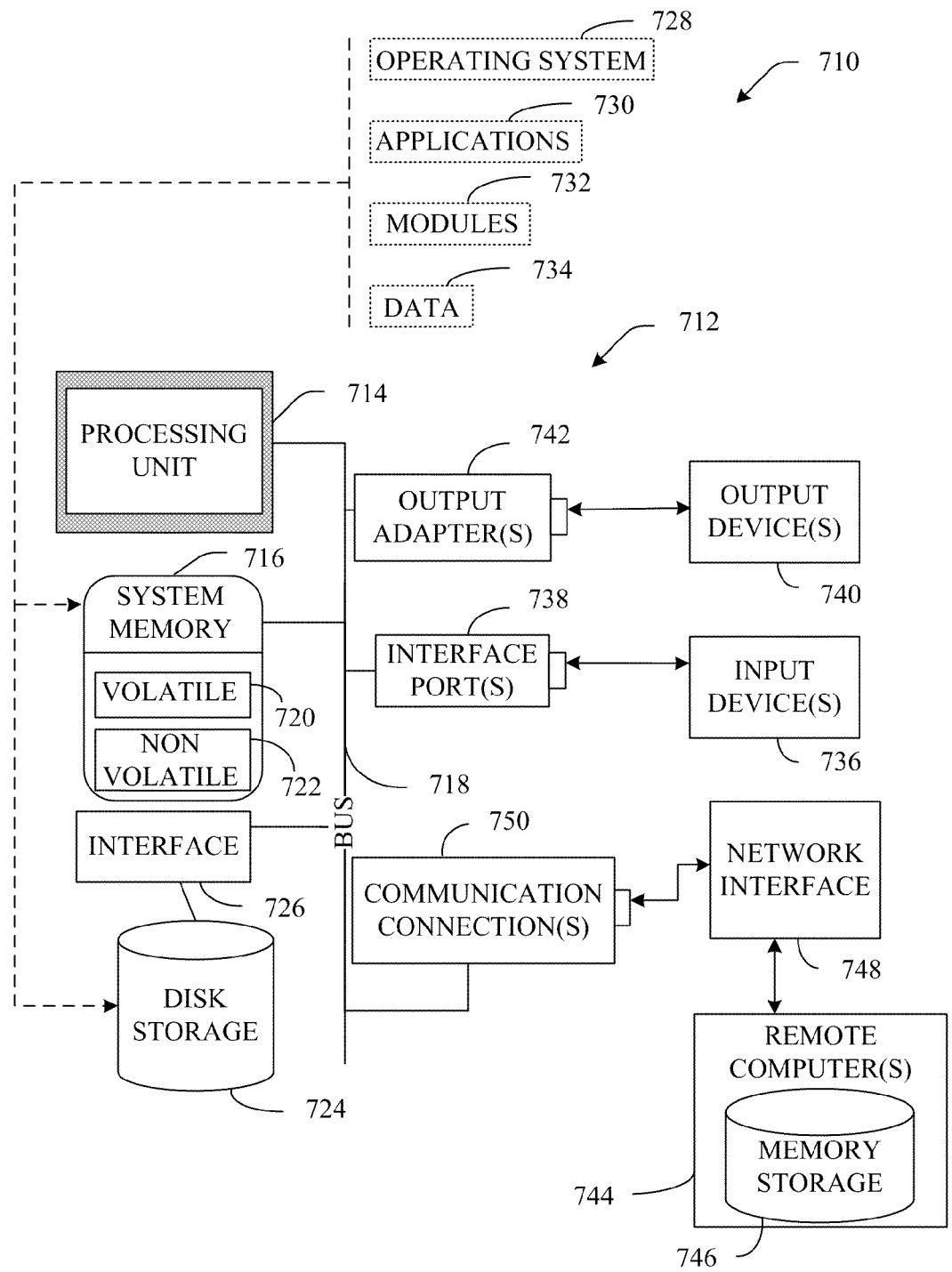
FIG. 7 illustrates an exemplary environment for implementing various aspects of the described caching tools and techniques.
Figure 8:
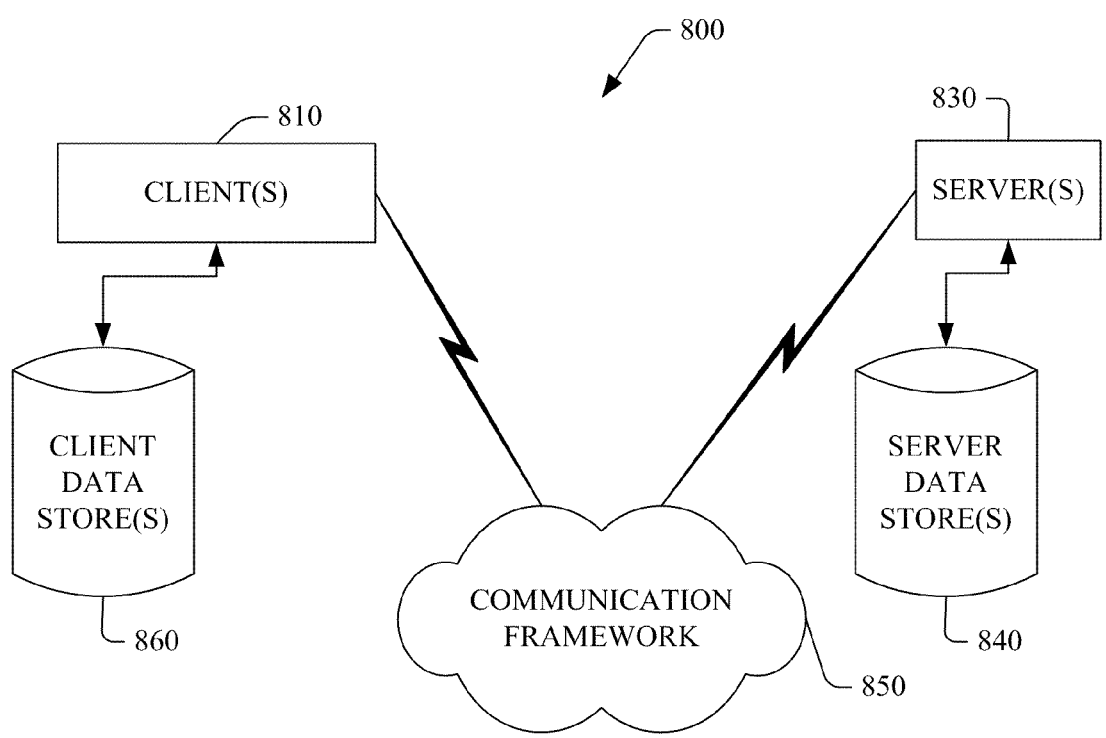
FIG. 8 is a schematic block diagram of a sample-computing environment that can be employed for caching configurations such as distributing cache.

In order to provide a context for the various aspects of the disclosed subject matter, FIGS. 7 and 8 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the tools and techniques also may be implemented in combination with other program modules.

As used in this application, the terms "component", "system", and "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the tools and techniques can be practiced on stand-alone computers. In a distributed computing environment, program modules may be located in both local and remote memory storage devices.

With reference to FIG. 7, an exemplary environment (710) for implementing various aspects of the described tools and techniques is described that includes a computer (712). The computer (712) can include a processing unit (714), a system memory (716), and a system bus (718). The system bus (718) can couple system components including, but not limited to, the system memory (716) to the processing unit (714). The processing unit (714) can be any of various available processors. Dual microprocessors and other multiprocessor architectures also can be employed as the processing unit (714).

The system bus (718) can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory (716) can include volatile memory (720) and/or nonvolatile memory (722). The basic input/output system (BIOS), containing the basic routines to transfer information between elements within the computer (712), such as during startup, can be stored in nonvolatile memory (722). By way of illustration, and not limitation, the nonvolatile memory (722) can include read only memory (ROM), programmable ROM (PROM), electrically programmable ROM (EPROM), electrically erasable ROM (EEPROM), or flash memory. The volatile memory (720) can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer (712) can also include removable/non-removable, volatile/nonvolatile computer storage media. FIG. 7 illustrates a disk storage (724), wherein such disk storage (724) can include, but is not limited to, devices like a magnetic disk drive, floppy disk drive, tape drive, Jaz drive, Zip drive, LS-60 drive, flash memory card, or memory stick. In addition, disk storage (724) can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage (724) to the system bus (718), a removable or non-removable interface is typically used, such as interface (726).

It is to be appreciated that FIG. 7 describes software that acts as an intermediary between users and the basic computer resources described in suitable operating environment (710). Such software can include an operating system (728). The operating system (728), which can be stored on disk storage (724), can act to control and allocate resources of the computer (712). System applications (730) can take advantage of the management of resources by operating system (728) through program modules (732) and program data (734) stored either in system memory (716) or on disk storage (724). It is to be appreciated that various components described herein can be implemented with various operating systems or combinations of operating systems.

A user can enter commands or information into the computer (712) through input device(s) (736). Input devices (736) include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit (714) through the system bus (718) via interface port(s) (738). Interface port(s) (738) include, for example, a serial port, a parallel port, a game port, and a universal serial bus (USB). Output device(s) (740) use some of the same type of ports as input device(s) (736). Thus, for example, a USB port may be used to provide input to computer (712), and to output information from computer (712) to an output device (740). Output adapter (742) is provided to illustrate that there are some output devices (740) like monitors, speakers, and printers, among other output devices (740) that utilize such adapters. The output adapters (742) include, by way of illustration and not limitation, video and sound cards that provide a means of connection between the output device (740) and the system bus (718). Other devices and/or systems of devices provide both input and output capabilities such as remote computer(s) (744).

Computer (712) can operate in a networked environment using logical connections to one or more remote computers, such as remote computer(s) (744). The remote computer(s) (744) can be a personal computer, a server, a router, a network PC, a workstation, a microprocessor based appliance, a peer device or other common network node and the like, and typically includes many or all of the elements described relative to the computer (712). For purposes of brevity, only a memory storage device (746) is illustrated with remote computer(s) (744). Remote computer(s) (744) is logically connected to the computer (712) through a network interface (748) and then physically connected via a communication connection (750). The network interface (748) encompasses communication networks such as local-area networks (LAN) and wide area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

A communication connection(s) (750) refers to the hardware/software employed to connect the network interface (748) to the bus (718). While the communication connection (750) is shown for illustrative clarity inside computer (712), it can also be external to the computer (712). The hardware/software for connection to the network interface (748) includes, for exemplary purposes only, internal and external technologies such as, modems including regular telephone grade modems, cable modems and DSL modems, ISDN adapters, and Ethernet cards.

FIG. 8 is a schematic block diagram of a sample computing environment (800) that can be employed for distributing cache. The environment (800) can include one or more client(s) (810). The client(s) (810) can be hardware and/or software (e.g., threads, processes, computing devices). The environment (800) can also include one or more server(s) (830). The server(s) (830) can also be hardware and/or software (e.g., threads, processes, computing devices). The servers (830) can house threads to perform transformations by employing the components described herein, for example. One possible communication between a client (810) and a server (830) may be in the form of a data packet adapted to be transmitted between two or more computer processes. The environment (800) can include a communication framework (850) that can be employed to facilitate communications between the client(s) (810) and the server(s) (830). The client(s) (810) can be operatively connected to one or more client data store(s) (860) that can be employed to store information local to the client(s) (810). Similarly, the server(s) (830) can be operatively connected to one or more server data store(s) (840) that can be employed to store information local to the servers (830).

VI. Cache Data Management

Distributed caches can solve the problem of data scale and performance by caching keys and their corresponding values across multiple cache nodes. As is discussed above, the data manager component in a distributed cache can handle the storage of the cache data.

Data management components often use data structures to map a key to a corresponding cache value, such as one or more values in a cache item or a cache region. For example, such a data structure may be in the form of a hash table that can be used as a main lookup data structure to look up and access cache values stored in the cache. Hash tables are data structures that map one or more keys to one or more corresponding values in an efficient fashion. The mapping can be done by hashing a key into an identifier, known as a hash key, and using that identifier to look up the corresponding cache value. Hash tables are often used for looking up and accessing cache units in caches. There are several design challenges in building a data manager that is scalable and efficient. The tools and techniques discussed below can address some of those challenges and/or provide improvements in cache data management.

A. Multiple Cache Directories

A multi-directory cache lookup data structure can be used to provide scalability and efficiency. In one embodiment, a multi-directory hash table can be used.

Figure 9:
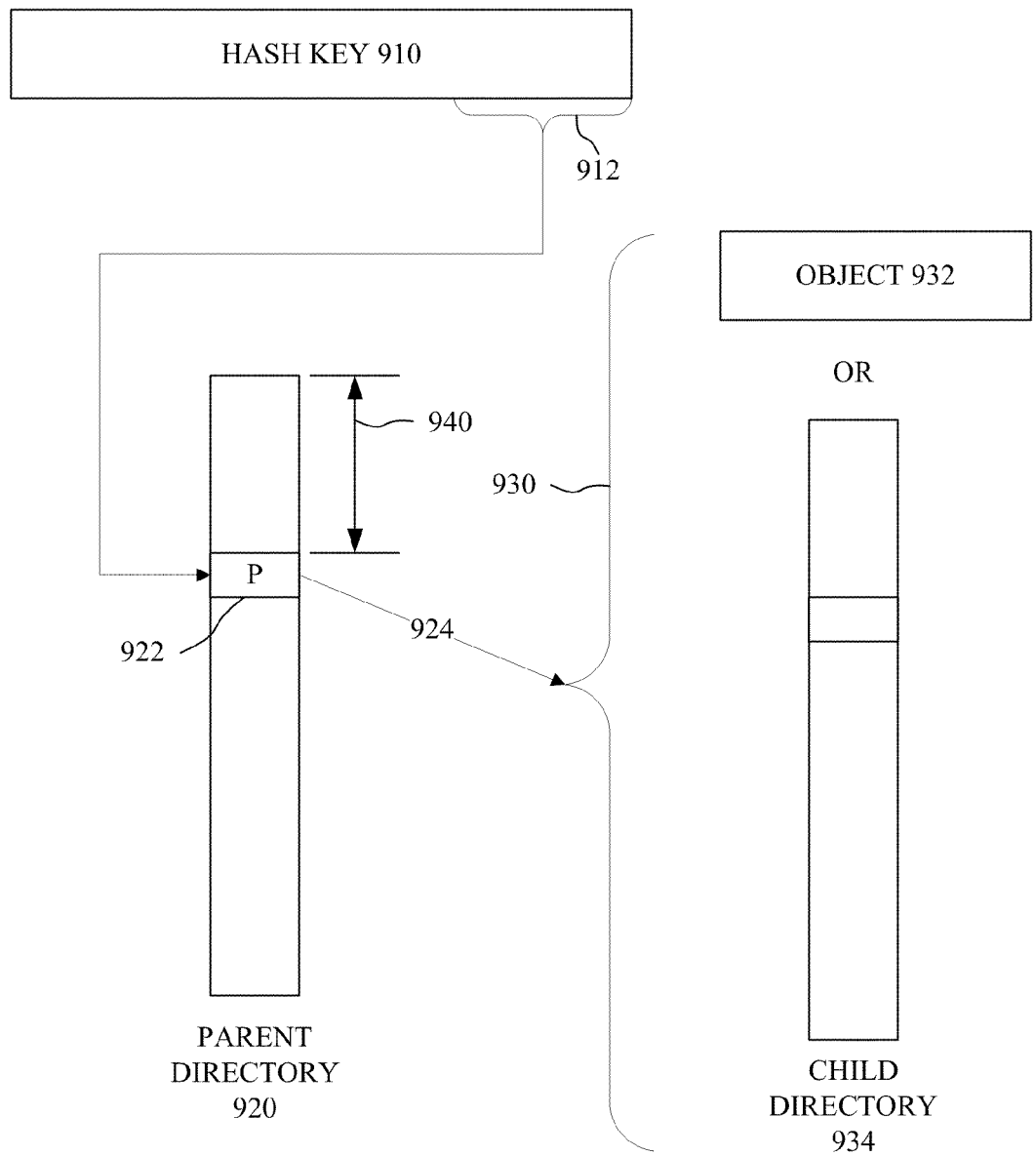
FIG. 9 is schematic block diagram illustrating a cache lookup data structure, such as a hash table.

Referring now to FIG. 9, a main cache lookup data structure (900), such as a hash table, can include a hierarchy of directories. If hash keys (910) are used as identifiers for cache objects (i.e., cache units, which may be cache items, cache regions, etc.) using a cache directory, then the hash keys (910) can be produced from original keys, such as keys provided by users or applications accessing the cache, using standard hashing functions.

A first portion (912) of the hash key (910) can be used to identify a location in a parent directory (920). A directory is an array of pointer slots (922). Each slot (922) in a directory, such as the parent directory (920), can include a pointer (924). For example, the pointer (924) can point to a cache object or cache unit (932) or to a subdirectory or child directory (934), which can also include pointers to one or more other directories and/or one or more cache objects. One or more of the slots in each directory (920, 934) may be null or empty, so that the slot does not include a pointer (924). The cache lookup data structure (900) can include a hierarchy of such directories. A specific slot (922) in the directory (920) can be identified using an offset (940) from a default position, such as a beginning of the directory (920). This offset (940) for the parent directory (920) can be specified by the first portion (912) of the hash key (910). A second portion of the hash key (910) may specify an offset to a specific slot in the child directory (934), which can point another child directory or to a cache object, such as a cache unit. Thus, the hash key (910) can correspond to a cache unit, and the portion(s) of the hash key (910) can be used to follow pointer(s) in the directories of the cache lookup data structure (900) to locate and access the cache unit.

In one implementation, the first portion (912) of the hash key (910) can be an integer specifying the offset (940) as a number of slots from a default position (such as the beginning of the directory), and the integer can have a fixed number of bits. The directory size (i.e., the number of slots in the directory) can also be fixed at a size that allows the integer to identify any of the slots in the directory. For example, if the offset integer uses b bits, then $n=2^b$ can be the size of the directory (920).

The offset of a root directory can be specified in the first n least significant bits of a hash key. For example, if the first two significant bits were used as the integer to specify offset, then a root directory could have a size of four, with slots 0 to 4. If a hash key 01100100 was used as a hash key identifier for a cache object, then a pointer to the object could be placed in slot 0 (zero offset) of the root directory because the first two least significant bits are zero (in binary).

Directory overflow (i.e., hash key conflict) can occur if hash keys of two different keys have the same n least significant bits. In this case, a sub directory can be created and the subdirectory can include pointers to objects corresponding to both keys, using the next n least significant bits of the hash keys.

It may be useful to estimate the number of number of items that are going to be identified by the hash table, and to allocate the root directory to be large enough to accommodate that number of items. Doing so can help avoid frequent conflicts between hash keys, and thus prevent frequent creations of additional directories in the hash table. Indeed, if no conflicts occur between hash keys, then the hash table can operate in a manner similar to a standard static hash table. However, it can also be extensible by using additional new subdirectories to accommodate larger numbers of cache items and corresponding hash keys that can produce conflicts.

1. Multi-Directory Hash Table Examples

Figure 10:
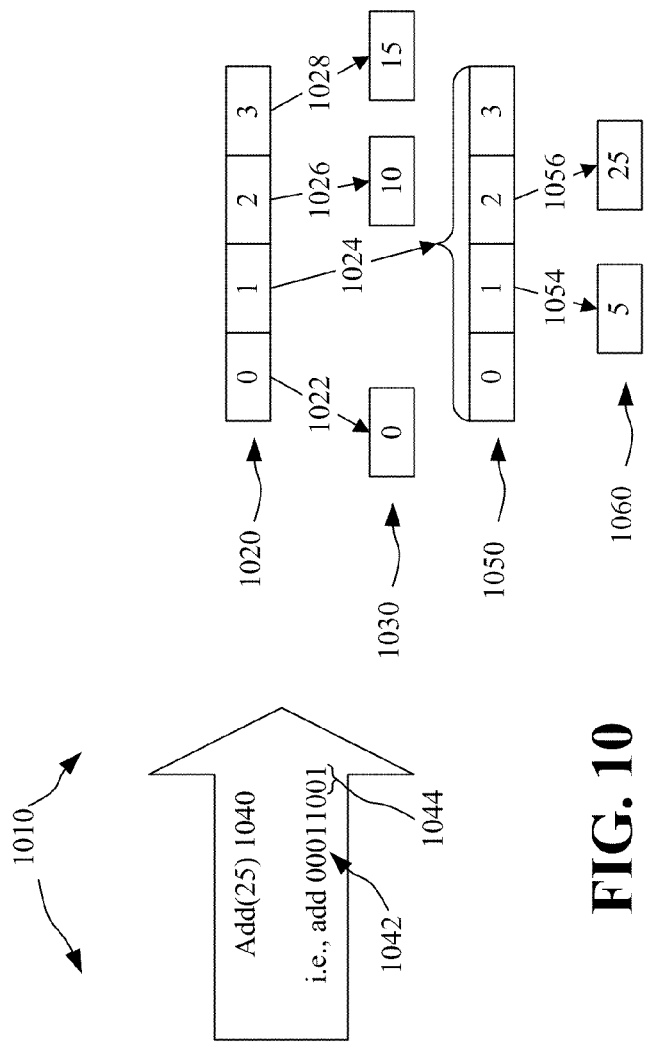
FIG. 10 is a schematic block diagram illustrating the insertion of a new entry in a cache lookup data structure.
Figure 10:
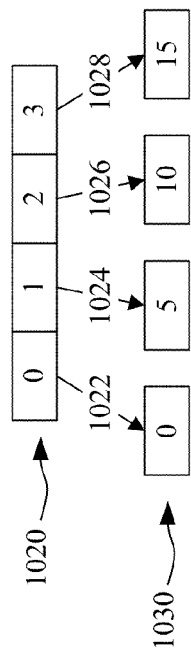

Referring now to FIG. 10, an example of a multi-directory hash table (1010) will be discussed. The hash table (1010) can include a root directory (1020) with 4 slots, which can be numbered according to the numbers in the boxes illustrating those slots in FIG. 10 (i.e., 0, 1, 2, and 3). The slots of the root directory (1020) can be addressed by the two least significant bits of hash keys, i.e., those two least significant bits can specify the offset to the corresponding slot in the root directory (1020). In this example, the hash keys can be the same as numeric keys given by a user, although they could be derived from the user-specified keys (e.g., names, numbers, etc.) using a hashing function. In either case, the hash keys can be hashed into the root directory (1020) using the first n least significant bits of each hash key, where n is 2 in the example of FIG. 10. Initially, as shown in the left side of FIG. 10, the root directory (1020) can include four pointers (1022, 1024, 1026, 1028) to four corresponding cache objects (1030):

- a pointer (1022) in slot 0 pointing to a cache object with a corresponding hash key of 0 (as specified in the box corresponding to that object in FIG. 10, with an 8-bit binary value 00000000, the two least significant bits being 00, or zero);
- a pointer (1024) in slot 1 pointing to a cache object with a corresponding hash key of 5 (with an 8-bit binary value 00000101, the two least significant bits being 01, or one);
- a pointer (1026) in slot 2 pointing to a cache object with a corresponding hash key of 10 (with an 8-bit binary value 00001010, the two least significant bits being 10, or two); and
- a pointer (1028) in slot 3 pointing to a cache object with a corresponding hash key of 15 (with an 8-bit binary value 00001111, the last two least significant bits being 11, or three).

A new operation "add(25)" (1040) can be invoked to add a new entry to the hash table (1010) pointing to an object with a corresponding hash key (1042) of 25, or binary 00011001, with a first portion (the first two least significant bits (1044)) being 01, or one. Accordingly, the two least significant bits of the new hash key (01) are the same as the existing hash key 5 (also 01). Accordingly, there is a hash conflict in slot 1 in the root directory (1020) because two hash keys (5 and 25) both specify that same slot. In such case, the hash table can be rehashed, as shown on the right side of FIG. 10. Specifically, the pointer (1024) in slot 1 in the root directory (1020) can point to a new subdirectory (1050), which can be a newly-created directory, although it could alternatively be a previously-created directory. In the new subdirectory (1050), the keys that correspond to slot 1 in the root directory (1020) can be rehashed using the next 2 least significant bits. The next two least significant bits for hash key 5 are 01, and the next two least significant bits for hash key 25 are 10. Accordingly, the subdirectory (1050) can include pointers (1054 and 1056) to the cache items or objects (1060) corresponding to hash keys 5 and 25 as follows: slot 1 of the subdirectory (1050) can include a pointer (1054) to the object corresponding to the hash key 5, and slot 2 of the subdirectory (1050) can include a pointer (1056) to the object corresponding to the hash key 25. Accordingly, this conflict can be resolved by extending the hash table (1010) to include a new subdirectory (1050) that points to the objects (1060) corresponding to the conflicting hash keys.

Figure 11:
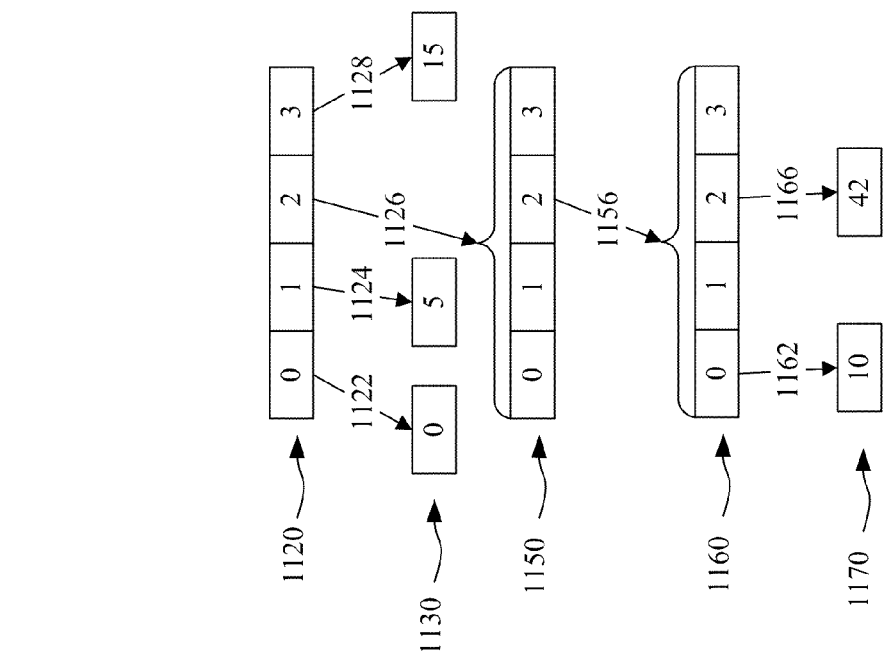
FIG. 11 is a schematic block diagram illustrating the insertion of a different new entry in the cache lookup data structure of FIG. 10.
Figure 11:
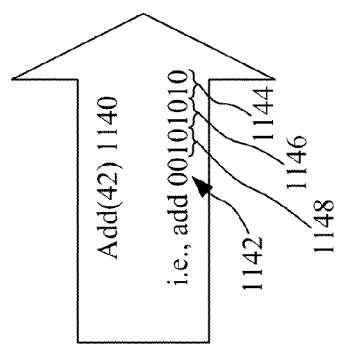
Figure 11:
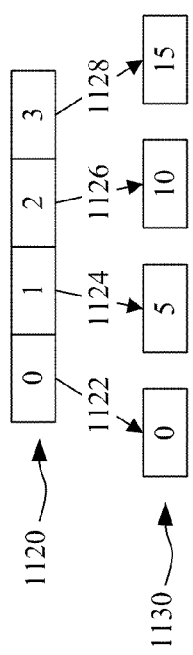

Note that if new directories are always created according to the technique described with reference to FIG. 10, it may result in creating more subdirectories than are needed to resolve the conflict. This scenario will be discussed with reference to a specific example illustrated in FIG. 11. FIG. 11 illustrates a hash table (1110) with the same initial state (illustrated on the left side) as the hash table (1010) discussed above with reference to the example of FIG. 10, including a root directory (1120) with pointers (1122, 1124, 1126, and 1128) pointing to corresponding objects (1130) whose hash keys have the same values as the objects (1030) illustrated in the initial example of FIG. 10.

An operation "add(42)" (1140) can be invoked to add a pointer to a new object with a corresponding hash key (1142) of 42, or 00101010 in binary. The hash key (1142) can have a first portion (1144) (the first two least significant bits) of 10, a second portion (1146) (the next two least significant bits) of 10, and a third portion (1148) (the next two least significant bits) of 10. Because the first portion (1144) has the bits 10 corresponding to slot 2 in the root directory, the hash key (1142) can be assigned to that slot. That assignment results in a conflict on slot 2 in the root directory because the existing hash key 10 (binary 00001010) is already assigned to slot 2.

As discussed above and illustrated in the right side of FIG. 11, in response to the conflict, the hash table (1110) can be extended to include a new subdirectory (1150), and the pointer (1126) in slot 2 of the root directory (1120) can point to the new subdirectory (1150). The conflicting keys 10 and 42 can be hashed in the new directory (1150) using the next two least significant bits (second portions) of the conflicting hash keys. However, the next two least significant bits for 10 and 42 (second portions) are both 10, and both identify slot 2 in the new directory (1150). Accordingly, these keys also result in a conflict in the new directory (1150). New subdirectories can continue to be created until the conflict is resolved.

Here, a pointer (1156) from slot 2 in the new subdirectory (1150) can point to another new subdirectory (1160), and the keys 10 and 42 can be rehashed to this new directory (1160) using the next two least significant bits (third portions) of the conflicting keys. For the key 10, the next two least significant bits are 00, so the key 10 can be assigned to slot 0 in the new directory (1160). For key 42, the next two least significant bits are 10, so key 42 can be assigned to slot 2 in the new directory. Thus, the new directory can include two pointers (1162 and 1166) pointing to the cache objects (1170) corresponding to keys 10 and 42, with the pointer (1162) in slot 0 pointing to the object corresponding to key 10 and the pointer (1166) in slot 2 pointing to the object corresponding to key 42.

Figure 12:
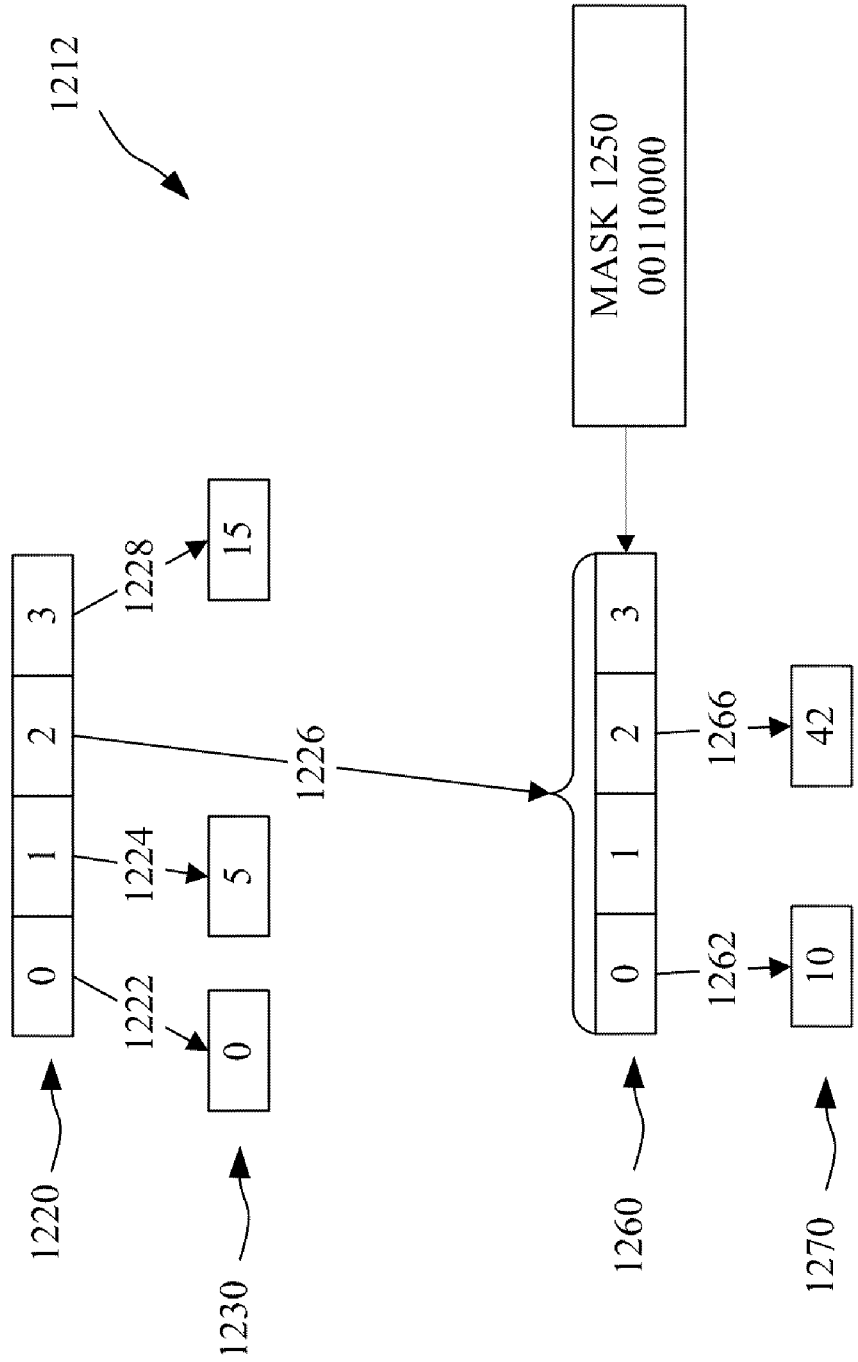
FIG. 12 is a schematic block diagram illustrating the cache lookup data structure of FIG. 11 with the new entry inserted using a masking technique.

Accordingly, the operation "add(42)" (1140) can result in two new directories (1150 and 1160) being formed to resolve a single conflict. To avoid having multiple directories formed to resolve a single conflict, it is possible to just split on the bits that resolve the conflict. Referring to FIG. 12, the same conflicting keys from FIG. 11 are illustrated hashed into a hash table (1212), with a root directory (1220) having pointers (1222, 1224, and 1228) pointing to respective objects (1230) corresponding to hash keys 0, 5, and 15. As with the example in FIG. 11 discussed above, there is a conflict in slot 2 of the root directory (1220) between keys 10 and 42. Accordingly, the pointer (1226) in slot 2 of the root directory (1220) can point to a new subdirectory (1260). However, instead of forming two new directories to resolve the conflict, a mask (1250) can be applied to hash the keys into the single new directory (1260) using the bits of the hash keys that resolve the conflict. In this case, the mask (1250) can specify that the fifth and sixth least significant bits are the second portions of the keys that will be hashed into the new directory (1260). For example, this can be specified by the mask (1250) having the binary value 00110000, where the 1's specify the bits to be used in hashing keys into the new directory (1260). Accordingly, the new directory (1260) can include pointers (1262 in slot 0 and 1266 in slot 2) pointing to respective objects (1270) corresponding to hash keys 10 and 42.

Thus, the masking technique illustrated in FIG. 12 and discussed above can split on the bits that resolve the conflict and avoid the creation of unneeded subdirectories or levels. To do this, a data manager component can keep track of the mask of the bits for each subdirectory and compute slot numbers for hash keys using the corresponding masks.

2. Hash Table Nodes

A lookup hash table can include and point to different kinds of hash table nodes, such as those described below. A hash table can point to object nodes, which can each include an actual cache unit (such as a cache item or region) and a hash key derived from a key corresponding to the cache item.

A hash table can include different types of directory nodes, including internal nodes and conflict nodes (for completely conflicting hash values). Both internal nodes and conflict nodes can each contain an array of directory entries. An internal node is a directory, which can point to one or more other directory nodes, conflict nodes, and/or object nodes. To access a node to which a directory is pointing, a number of offset bits can be specified for the directory. As discussed above, a directory slot or entry can be specified with an offset or depth value, which can have the number of offset bits, and can specify the offset into the directory. For example, if there is a 10-bit offset (size of directory is 1024), then in a root directory node, the depth or offset can be specified using the 10 least significant bits of a hash key. For a directory node one step below the root directory node, the next 10 least significant bits of a hash key can be used to specify the depth or offset.

The problem of conflicts, which was discussed above, can be more serious if there is a perfect hash conflict, where two different objects are assigned the same hash key. To deal with such a situation, a data structure such as a hash table can include conflict nodes. The hash table can store objects with pointers to the cache items corresponding to all of the conflicting hash keys. The conflict nodes can store such objects or pointers to such objects. Conflict nodes can be extended to accommodate as many keys as hash to the same hash key. Conflict nodes can be implemented as chained buckets to keep track of objects with conflicting hash key values. A get operation on such a conflict node can scan all the objects pointed to by the conflict node and look for the given key. The buckets can include multiple conflict nodes, and a conflict node level lock can be implemented when a change is made to any of the slots in the conflict node. Alternately, conflict nodes could be implemented in some other way, such as using concurrent linked lists, where locks may not need to be taken on an entire list when changes to the list are made.

Figure 13:
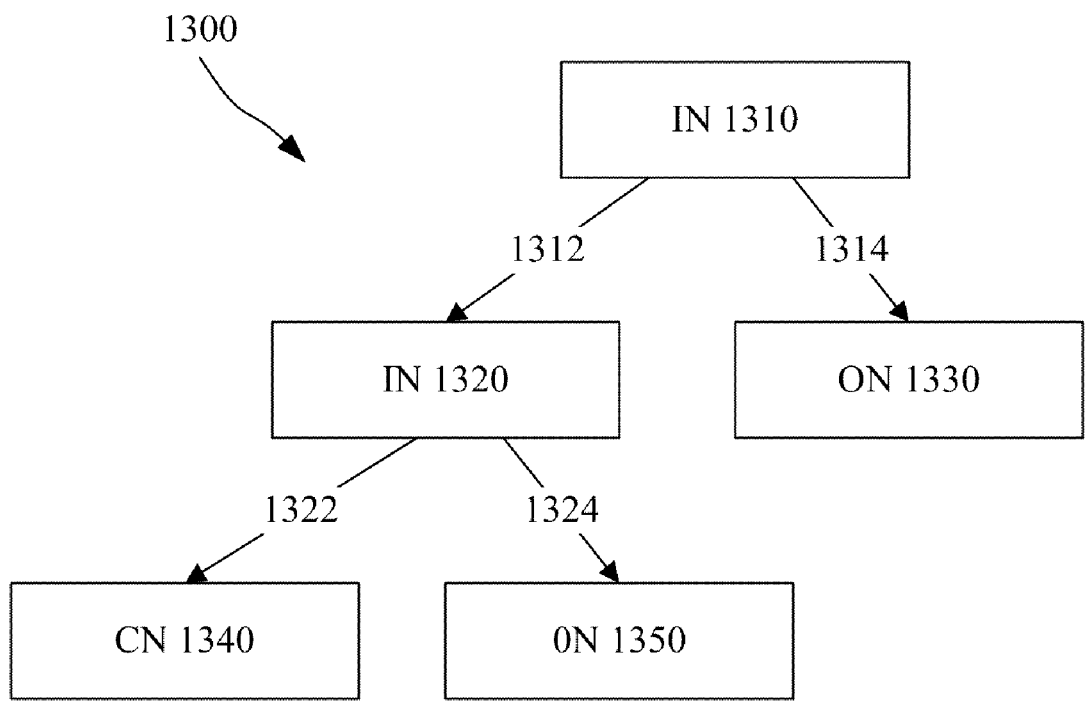
FIG. 13 is a schematic block diagram illustrating an example of nodes in a multi-directory hash table.

Referring now to FIG. 13, hash table nodes in an example of a multi-directory hash table (1300) will be discussed. In the illustrated example, a root directory or internal node (1310) can include pointers (1312 and 1314), with one pointer (1312) pointing to a subdirectory or internal node (1320) and another pointer (1314) pointing to an object node (1330). The lower level internal node (1320) can include pointers (1322 and 1324), with one pointer (1322) pointing to a conflict node (1340) and another pointer (1324) pointing to an object node (1350).

3. Multi-Directory Cache Lookup Techniques

Figure 14:
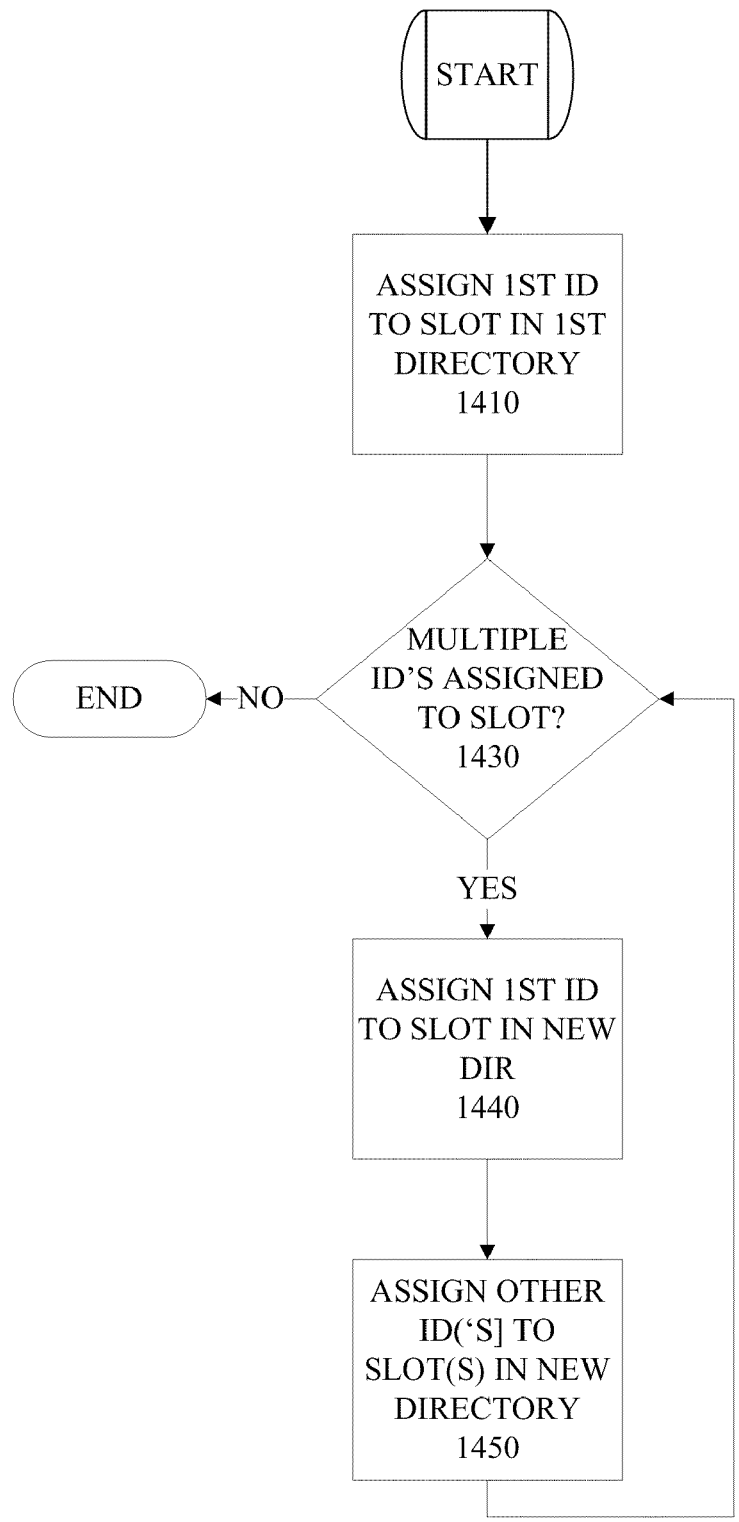
FIG. 14 is a flow diagram illustrating a technique for assigning identifiers to a multi-directory cache lookup structure.

Referring now to FIG. 14, a multi-directory cache lookup technique will be described. As with other techniques described herein, this technique can be used with the cache systems and components discussed above and/or with other combinations of systems and components. In the technique, a first portion (such as a first number of least significant bits) of a first identifier identifying a first cache unit (such as a cache item or region) can be used to assign (1410) the first identifier to a slot in a first directory in a cache lookup data structure. One or more other identifiers may previously have been assigned to the first directory as well. These assignments can be made in various ways, such as placing pointers to the items in directory slots if the slots are not yet filled, or placing pointers to other directories that can lead to the items through a chain of one or more pointers if the slots have already been filled.

It can be determined (1430) whether one or more other identifiers have been assigned to the slot, or in other words whether multiple identifiers, including the first identifier and one or more other identifiers, will be assigned to the slot. If not, then the technique can come to an end. Note that references to the "end" and "start" of techniques discussed herein and in the accompanying figures is for convenience; additional operations, acts, etc. may occur before and/or after what is illustrated and discussed. If multiple identifiers will be assigned to the same slot in the first directory, then a second portion of the first identifier can be used to assign (1440) the first identifier to a slot in a new directory, which can be a pre-existing or newly-created directory other than the first directory. For example, it can be determined whether the first slot in the first directory holds a pointer to another directory. If so, then that other directory can be the new directory. If not, then the new directory can be created and a pointer to the new directory can be inserted in the slot in the first directory where the conflict occurs. A second portion of each of the one or more other identifiers can be used to assign (1450) each of the one or more other identifiers to one or more slots in the second directory. As an example, the first portion may be the first n least significant bits in the corresponding identifier, the second portion may be the next n least significant bits in each identifier, etc. Alternatively, the second portion may be identified by a mask, such as a mask that identifies bits that distinguish between the keys. It can also be determined (1430) whether the new assignments to the new directory will result in multiple identifiers being assigned to the same slot in the new directory. If not, then the technique can come to an end. But if so, then the conflicting identifiers can be assigned to another new directory. This technique can continue to loop through the determination (1430) and the assignment (1440 and 1450) of the identifiers to slots in new directories using new portions of the identifiers until the identifiers are assigned to different slots in a directory or it is determined that the identifiers are the same. If the identifiers are the same, then the identifiers can be assigned to a conflict node that points to the cache units corresponding to the identifiers or that includes the identifiers.

The technique can also include, for each conflicting slot in an existing directory to which multiple identifiers are assigned, inserting a pointer to the new directory where the multiple identifiers are assigned as well. In this way, the identifiers can be assigned to one or more slots in the new directory and to the conflicting slot in the existing directory. The identifiers discussed above with reference to FIG. 14 can be hash keys, and the directories can be included in a multi-directory cache lookup data structure, such as a multi-directory hash table.

B. Compaction

As discussed above, using multiple cache directories to resolve conflicts between keys may lead to some unnecessary directories being created, which can adversely affect performance of the directory structure. To address this issue, directories in a lookup data structure can be compacted. Specifically, if a directory node points to less than two other hash table nodes (i.e., if only one or none of the directory slots is filled), the directory node can be removed. It can be desirable to perform this removal/compaction operation without taking latches or locks that would cause failures for read and write operations.

Figure 15:
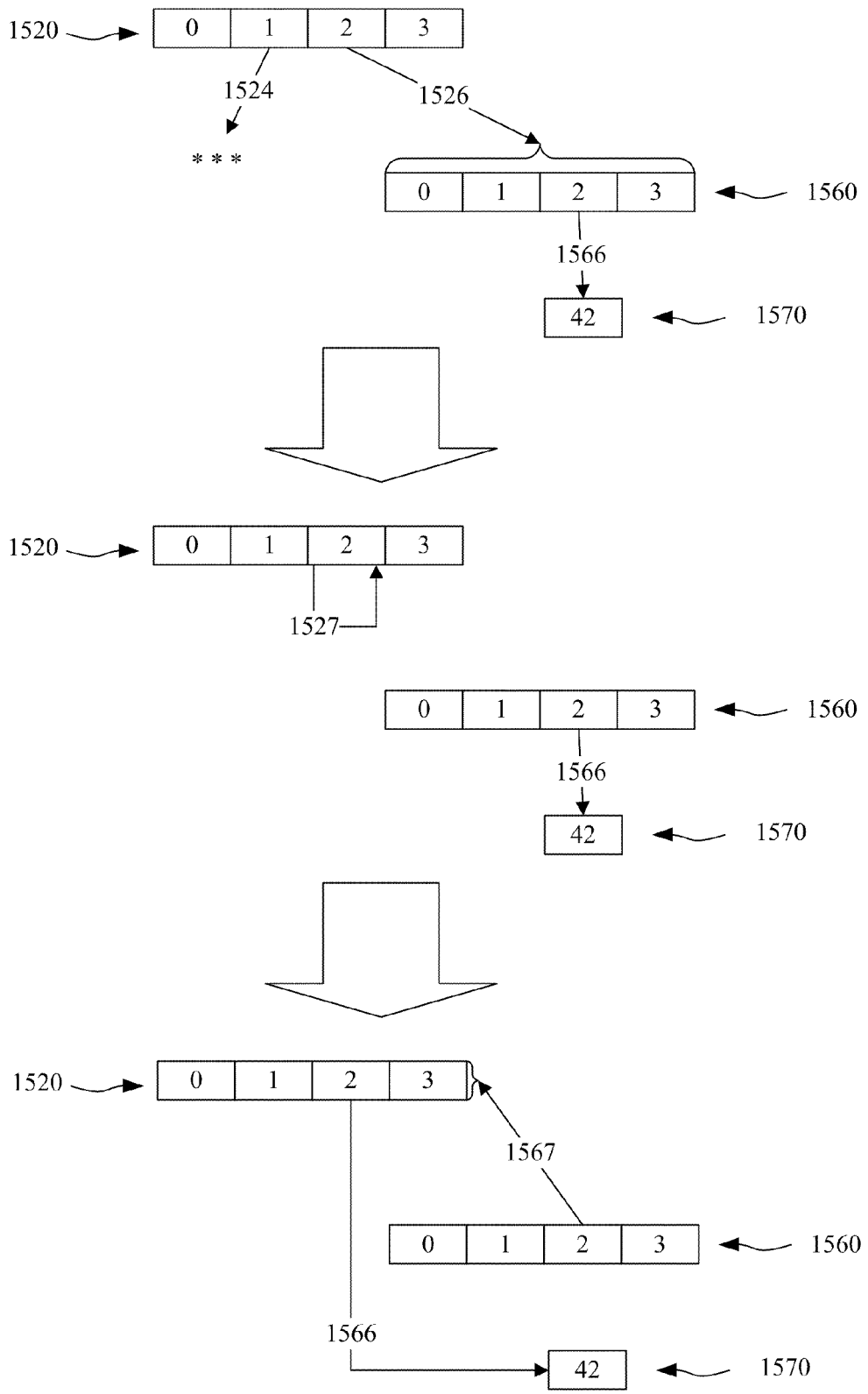
FIG. 15 is a schematic diagram illustrating a compaction technique.

Referring now to FIG. 15, a compaction technique will be discussed, starting with an example of a directory node pointing to less than two other hash table nodes. Specifically, referring to the top portion of FIG. 15, initially a parent directory (1520) may include pointers (1524 and 1526) in slots 1 and 2. The pointer (1524) can point to other hash table nodes that are not illustrated. The pointer (1526) in slot 2 of the parent directory (1520) can point to a leaf directory (1560). The leaf directory (1560) can be empty except for a pointer (1566) in slot 2 pointing to a cache unit (1570).

In compacting this or similar structures, a first count can be performed, counting the non-empty slots in a directory, such as the leaf directory (1560) of FIG. 15. If the result of this first count is found to be greater than one, then the technique can return control. If not, then there is no more than one item or pointer in the directory (1560). If this is the case, then the slot in the parent directory (1520) can be replaced with a self-pointer (1527) resulting in a self-loop, as is illustrated in the middle portion of FIG. 15. With this self-pointer (1527) in place, read and write operations intended for the leaf directory (1560) and the cache unit (1570) will continue to loop so that no locks are needed during the compaction technique. After this self-pointer (1527) is in place, a second count of pointers in the leaf directory (1560) can be performed to assure that no items or pointers have been added to the leaf directory (1560) since the first count. If the second count is not equal to the first count, then the technique can replace the self-pointer (1527) with the original pointer (1526) in the parent directory (1520) and return control without compacting.

If the second count is equal to the first count, then the slot in the parent directory (1520) can be replaced with the same pointer (1566) that was found in the child directory (1560). If no pointers were found in the child directory in the first and second counts, then the slot in the parent directory can be null or empty. The slot in the child directory may include a temporary pointer (1567) back to the parent directory to assure that any operations that were en-route to the slot in the child leaf directory (1560) will be redirected to the parent directory (1520), and then to the cache unit (1570).

Figure 16:
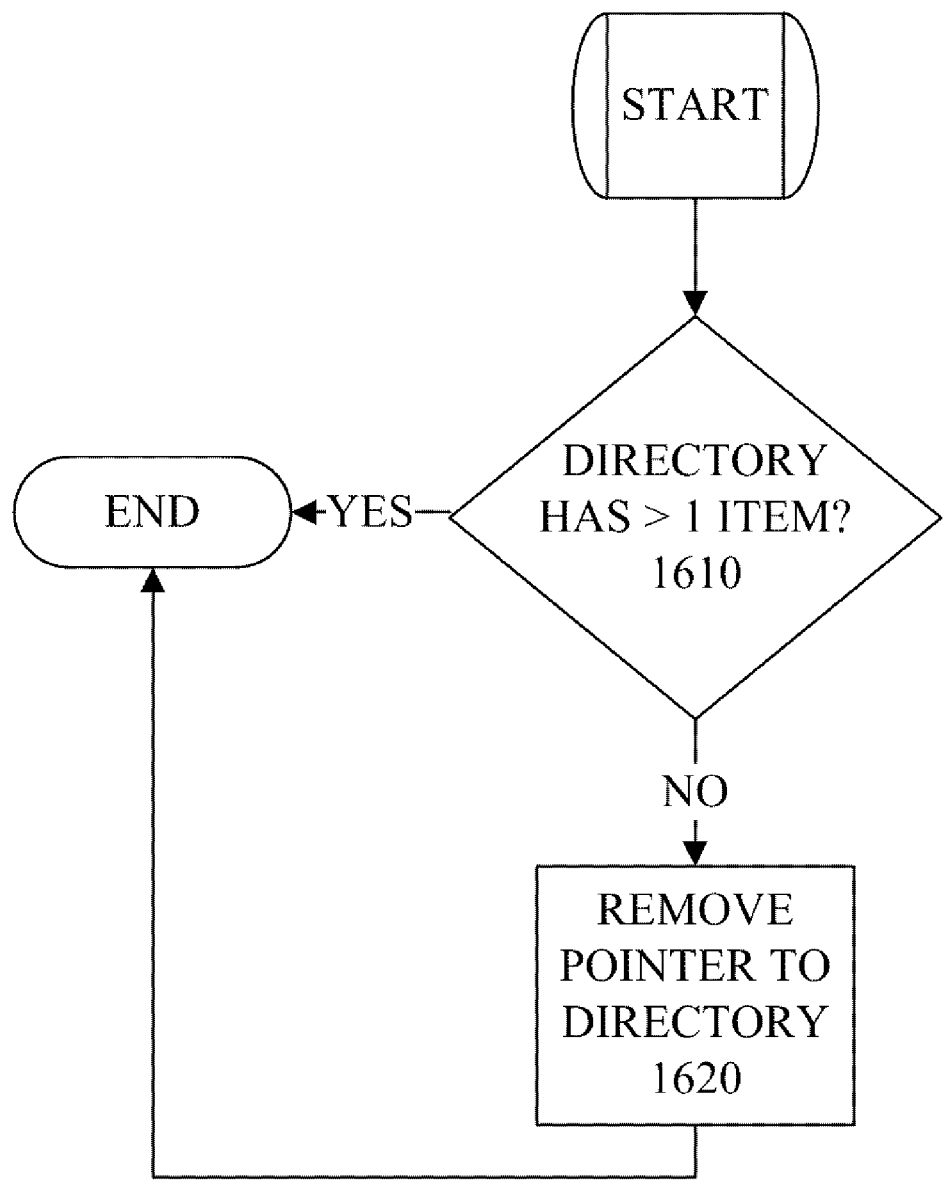
FIG. 16 is a flow diagram illustrating a compaction technique.

Referring now to FIG. 16, a general compaction technique will be discussed. In the technique, a multi-directory data structure, such as a hash table, can have directories including a root directory and one or more lower directories below the root directory. The directories can each include one or more directory items each pointing to another directory or to one or more cache units. In the technique it is determined (1610) whether a child or subject directory in the data structure includes more than one item, such as a pointer to another directory or a cache unit. The child directory can be pointed to by a parent pointer in a parent slot in a parent directory. If the child directory does not include more than one item, then the parent pointer can be removed (1620) from the parent slot. If the child directory has only one item, then removing (1620) the parent pointer can include replacing the parent pointer with the one item from the child directory. If the child directory has no items, then removing (1620) the parent pointer can include leaving the parent slot empty, or null.

Determining (1610) whether the child directory has more than one item can include performing a first count of non-empty slots in the child directory, replacing the parent pointer in the parent slot with pointer that points to itself, and performing a second count of non-empty slots in the child directory. Removing (1620) the parent pointer may be done if the first count is not more than 1 and the second count is equal to the first count, or not more than 1.

C. Write-Only Latches

In a typical cache, the number of reads (cache hits) are higher than the number of writes. Accordingly, it can be useful for a cache to satisfy reads faster than writes. Additionally, it can be desirable for a cache to facilitate concurrent operations on the cache. For example, it can be useful for a distributed cache to perform efficiently in a multi-core machine, where multiple read and/or write operations may be occurring at the same time. In dealing with such concurrent operations, it can be useful for a cache to be able to handle write operations without locking out read operations. In addition, it can be useful for a cache hash table to handle large numbers of read requests without contention between resulting read operations.

Common Language Runtime (CLR) supports an existing hash table that is not distributed. The CLR hash table is thread safe for use by multiple reader threads and a single writing thread. It is thread safe for multi-thread use when only one of the threads perform write (update) operations, which can allow lock-free reads, provided that the writers are serialized to the hash table. To support multiple writers, all operations on the hash table must be done through the wrapper returned by the Synchronized method. The Synchronized method supports multiple writing threads, provided that no threads are reading the hash table. The synchronized wrapper does not provide for write-only locks on the hash table, and does not provide thread-safe access in the case of one or more readers and one or more writers. Whatever the advantages of such a hash table, it does not provide the advantages of the write-only latch tools and techniques discussed herein.

While concurrent operations are occurring in a cache lookup data structure, such as a hash table, it can be desirable for put and get operations to be atomic, so that an entire put or get succeeds or fails together. It can also be desirable for objects to be returned in some consistent state in response to get requests. In addition, it can be desirable to avoid losing requested updates to the data structure as a result of concurrent operations. In addition, as discussed above, it can be desirable to avoid blocking read-only operations.

Figure 17:
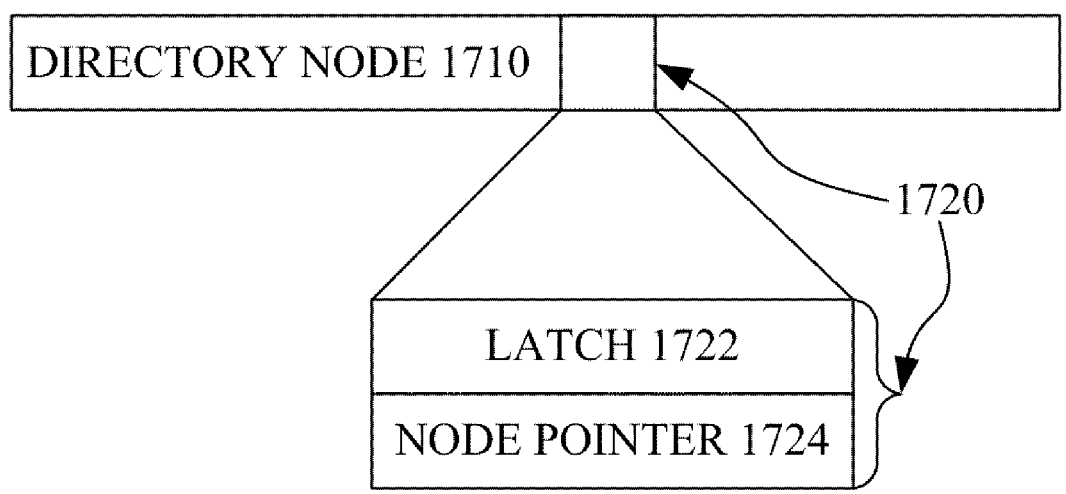
FIG. 17 is a schematic diagram illustrating a directory with an entry having a latch.

Latches can be used to help ensure atomicity of get and put operations in a cache lookup data structure, such as a hash table, in case of concurrent modifications to the structure. Referring to FIG. 17, a directory node (1710) can include one or more directory entries (1720), such as entries in the directory slots discussed above. Each directory entry (1720) can include a latch (1722), which can toggle between a latched state and an unlatched state. Each directory entry (1720) can also include a node pointer (1724), which can point to another node, such as one of the types of nodes discussed above with reference to FIG. 13 (object node, internal node, etc.). Write operations can flip the latch (1722) to latch the directory entry (1720) before changing the node pointer (1724), which can change the reference to which the directory entry points. Upon completion of a write operation, the latch (1722) can be flipped back to the unlatched state.

Each object node that is referenced by a directory entry can be in a consistent state so that reads done without taking latches will always see the consistent object. This can occur by avoiding changes to the object nodes referenced by the lookup data structure. As discussed below, instead of making such changes or updates directly to the object node itself, a new object node can be saved and prepared for access, and then a pointer to an existing object node can be replaced with a pointer to the new object node. Thus, read operations can return either the full existing object node or the full new object node—in either case the object returned can be consistent and the operation can be atomic.

1. Write Operations

Write operations can include pre-operations and post-operations, which can be performed while the subject directory entry is latched. The pre- and post-operations can be delegated with a command, such as the following: void PrePostOperation(object oldItem, object newItem).

In performing the write operations, a hash key corresponding to a given key corresponding to the cache unit of interest can be found. A leaf directory corresponding to the hash key can be found. For example, this can include using a first n least significant bits of the hash key to find a slot in a root directory, following a pointer in that slot, using the next n least significant bits of the hash key to find a slot in a subdirectory below the root directory, following a pointer in that subdirectory, etc. until a leaf node corresponding to the given hash key is found. The slot number corresponding to the given key in the leaf directory can be found, and the slot can be latched. If the slot is pointing to an internal node, the latch can be released, and the operation can resume following the links in the directories.

Once the object node is found, sanity checks and pre-operations can be performed on the latched slot and the referenced object node. For example, the operation can check whether the key for the object of interest matches the one in the object node that was found. If one or more of these checks fails, an error can be thrown, which may result in the slot being unlatched and the write operation being terminated.

If the checks succeed, the new pointer pointing to the new object node can be retrieved and marked as uncommitted (i.e., not currently in use). In addition, the existing committed pointer (i.e., the pointer that is currently in use) can be linked with the new pointer, and the new pointer can be placed in the slot.

A check can be done to determine whether a compaction of the directory structure would result in a bypass the slot. Specifically, the operation can check whether a parent hash node slot that should be pointing to the hash node with the slot of interest is actually pointing to some other node. If so, then any changes can be rolled back, the latch can be released, and the technique described herein can resume with traversing the directory structure to find the correct slot that is currently pointing to the cache unit or object of interest, and sanity checks can be performed again, the new pointer can be placed in the new slot, etc.

Standard post-operations can then be performed to prepare for use of the new cache unit. It can be desirable attempt to prevent the post-operations from failing, although the pre-operations discussed above may fail (such as if the sanity checks fail). The new pointer in the slot can then be marked as committed and the slot can be unlatched.

This general write operation can be used to implement specific operations like Add, Put, Delete, etc. in similar ways.

2. Read Operations

As discussed above, read operations, such as get operations, can be done without taking latches. A read operation can include finding a hash key corresponding to a given key for a cache unit to be read. The look-up data structure can be traversed from a root directory to find the object node corresponding to the given hash key. If the given key matches the one present in the object node, then the cache unit pointed to by the committed pointer, i.e., the cache unit in the committed object node, can be returned.

3. Write-Only Latch Technique

Figure 18:
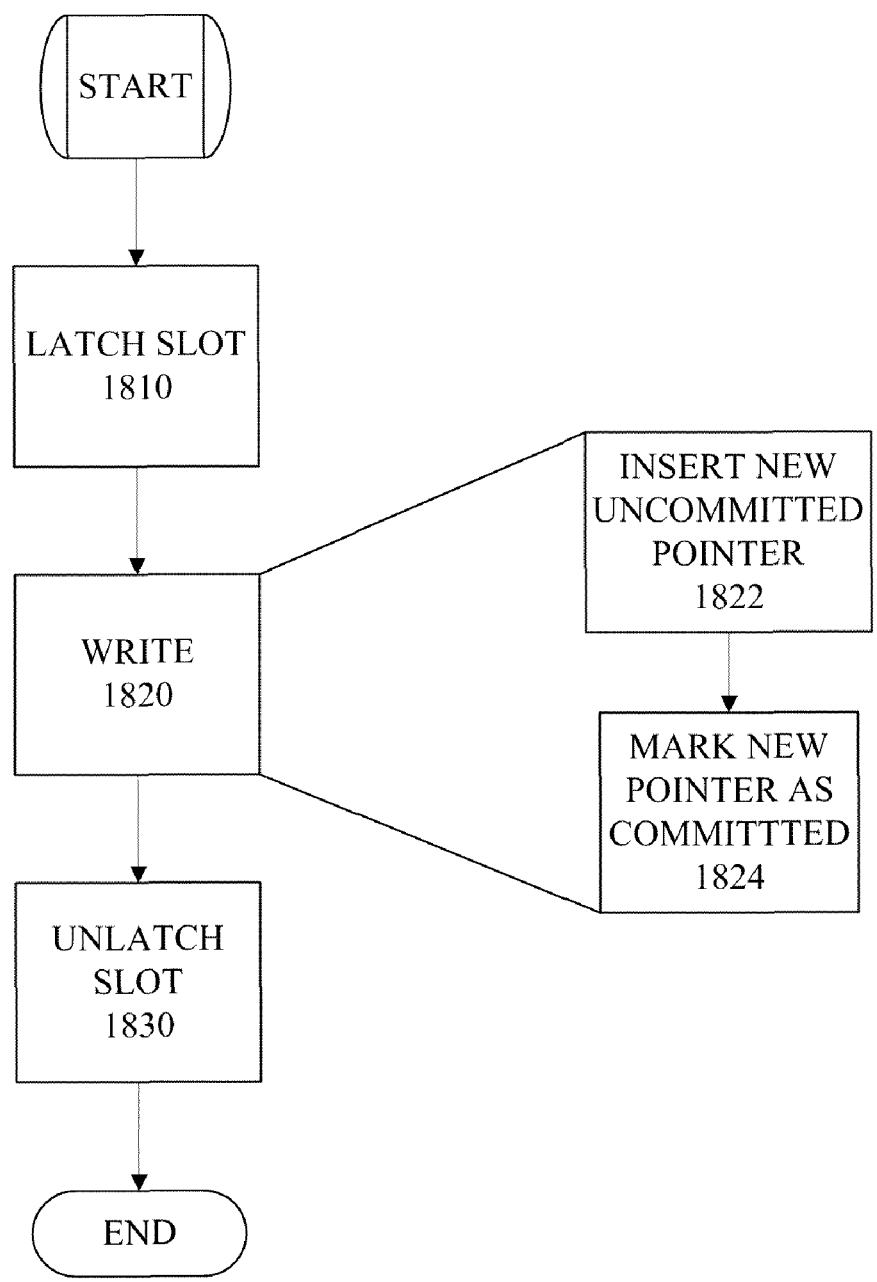
FIG. 18 is a flow diagram illustrating a write-only latch technique.

A write-only latch technique will be described with reference to FIG. 18. In the technique, a slot can be latched (1810) to prevent other write operations while a subject write operation (1820) is performed on an existing cache unit that is pointed to by an existing committed pointer in a cache directory slot. However, the latching (1810) can allow read operations on the cache unit during the write operation (1820). The write operation (1820) can include inserting (1822) a new uncommitted pointer in the slot, and then marking (1824) the new pointer as being committed. In addition, the slot can be unlatched (1830) after the write operation is complete.

The write operation (1820) can be any of a variety of write operations, such as a delete operation or an update operation. The write operation (1820) may proceed even while one or more read operations are being performed on a cache unit. Those read operations can produce consistent data corresponding to the cache unit prior to the write operation.

D. Eviction and Expiration

It can be useful for a cache to efficiently handle eviction and expiration of objects. Eviction from a cache can be based on a policy, such as a least recently used policy or a least frequently used policy. In addition, expiration from a cache can be based on a time to live for a particular object. Eviction and expiration can be used for removing items, directories, etc. from a lookup data structure and from a cache to limit the memory consumption of the structure and the cache.

The granularity of cache clean-up using eviction and expiration can be defined by defining the candidates for removal. For example, candidates may include cache units or object nodes that are pointed to by an entry in a leaf directory, and/or directories themselves. In addition, the cache units can be cache items, cache regions, etc. The candidates can be selected for removal based on their priority. This priority can be decided using statistics maintained along with the candidate in the lookup data structure. For example, the statistics can include a time to live and a creation time for a particular candidate, which can define the candidate's expiry status. In addition, the statistics can include a last access time for each candidate, which can define the candidate's eviction priority (e.g., according to a least recently used priority policy).

1. Eviction and Expiration Using Different Priority Queues

Figure 19:
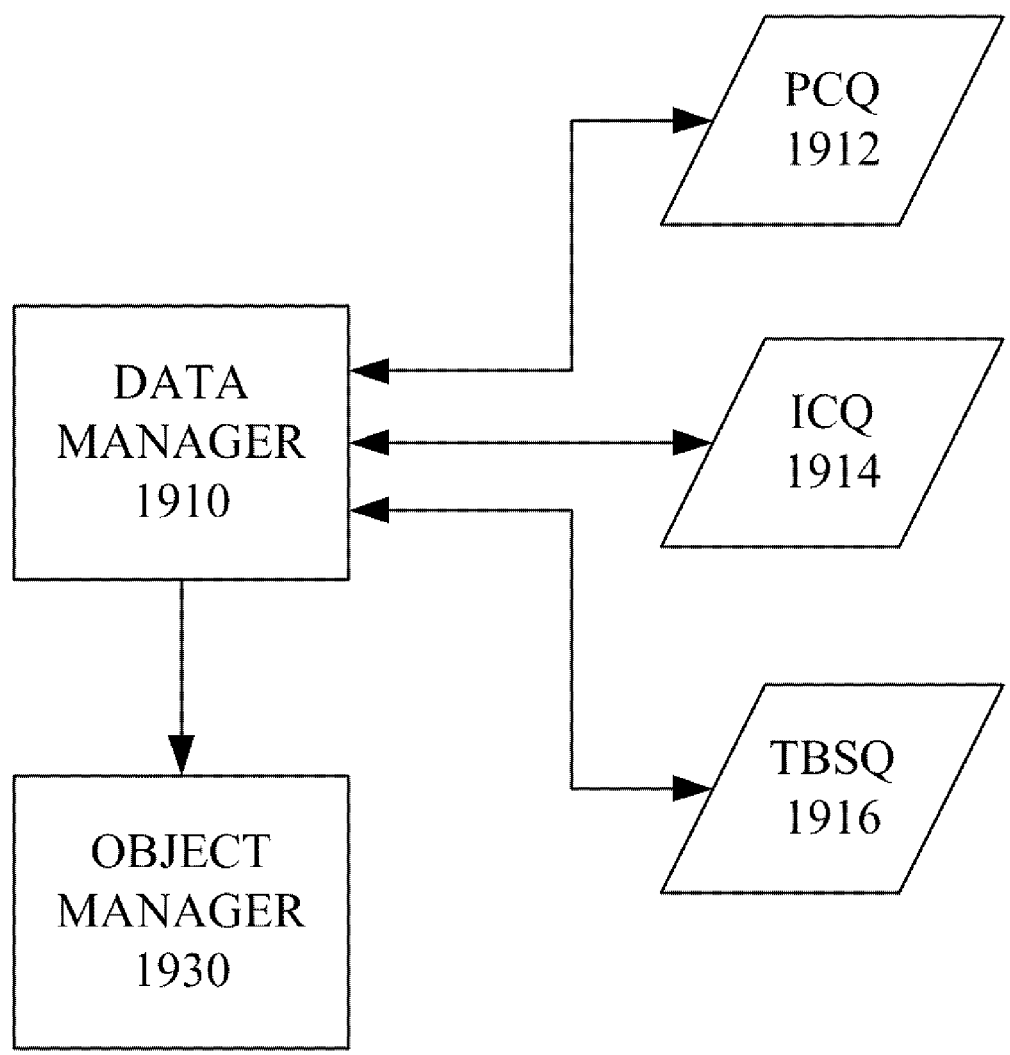
FIG. 19 is a schematic block diagram illustrating an environment for removing cache units from a cache.

Referring to FIG. 19, using the priority statistics, a data manager component (1910) can maintain a priority cleanup queue (PCQ) (1912) of removal candidates. The data manager component (1910) can perform a memory cleanup operation and can remove candidates in priority order using the PCQ (1912). For candidates having the highest possible priority of removal, sorting my not need to be done. These high priority candidates can be listed in a separate immediate cleanup queue (ICQ) (1914). In this context, "immediate" does not mean that the candidates must be instantly deleted when they are included in the ICQ (1914). Rather, in response to a request for a candidate for cleanup, the data manager component (1910) can return a candidate from the ICQ (1914) before returning candidates from the PCQ (1912). The data manager component (1910) can also maintain a separate queue for items to be sorted (TBSQ) (1916). When candidates are to be removed from the cache, the data manager component (1910) can perform the removal by instructing an object manager component (1930) to explicitly remove selected candidates returned from the ICQ (1914) and/or PCQ (1912). Each of the queues (1912, 1914, and 1916) can include pointers to the actual candidates for removal, although they could include the candidates themselves.

The priority statistics (e.g., last access time) can be modified by each operation on the particular candidate. For example, in a least recently used strategy, the read operations and/or write operations typically make the candidate being written or read the least suitable for eviction. Accordingly, after any such operation, the PCQ (1912) may not be accurate until the PCQ (1912) is sorted again.

Operations can check whether a candidate associated with a key is expired upon each operation, periodically, or according to some other scheme. If a candidate is expired, the candidate can be included in the ICQ (1914). Candidates can also be included in the ICQ (1914) on-demand when the ICQ (1914) is found to be empty upon receiving a request to remove an item from the cache. However, a removal request may not result in an immediate traversal and re-sorting of the PCQ (1912) or TBSQ (1916).

Because sorting can be a resource-intensive operation, and sorting more candidates takes more resources, different approaches can be taken to reduce the number of candidates sorted by each sort operation. For example, a specified batch size can be selected, where only the batch size number of candidates are selected for each sort run, and/or multiple TBSQ's (1916) can be used to distribute the items to sort.

Following is a discussion of an example approach that can be taken to sort and remove candidates from a cache. A removal request can result in the selection of a candidate from either the head of the ICQ (1914), or if ICQ is empty (even after trying to repopulate it), then from head of the PCQ (1912). This candidate can be deleted explicitly by the object manager component (1930). This can be done for as many candidates as are requested to be removed.

The ICQ (1914) and the PCQ (1912) can be maintained by a sweeping technique. The sweeping technique can include walking over the PCQ (1912) and the TBSQ (1916) and finding candidates in those queues that are eligible for immediate cleanup (e.g., the expired candidates). Such candidates can be moved to the ICQ (1914).

The PCQ (1912) can be maintained using a mark-and-sweep strategy. When a statistic for a candidate is updated (typically indicating that the candidate has been accessed), the candidate can be marked with a flag. When marked candidates are encountered in the PCQ (1912) by an operation responding to a removal request, the marked candidates need not be removed. Instead, when marked candidates are encountered by such requests, the candidates can be moved to the TBSQ (1916).

During a sweep, the unsorted candidates can be collected from TBSQ (1916) and unmarked. The collected candidates can be sorted, and the sorted candidates can be merged with the existing candidates in the PCQ (1912).

Sweeping can be invoked in various ways. For example, sweeping can be invoked asynchronously by a separate thread that calls a sweeping module periodically, and/or on-demand when the corresponding queue is empty upon receipt of a removal request.

2. Eviction and Expiration Techniques

Figure 20:
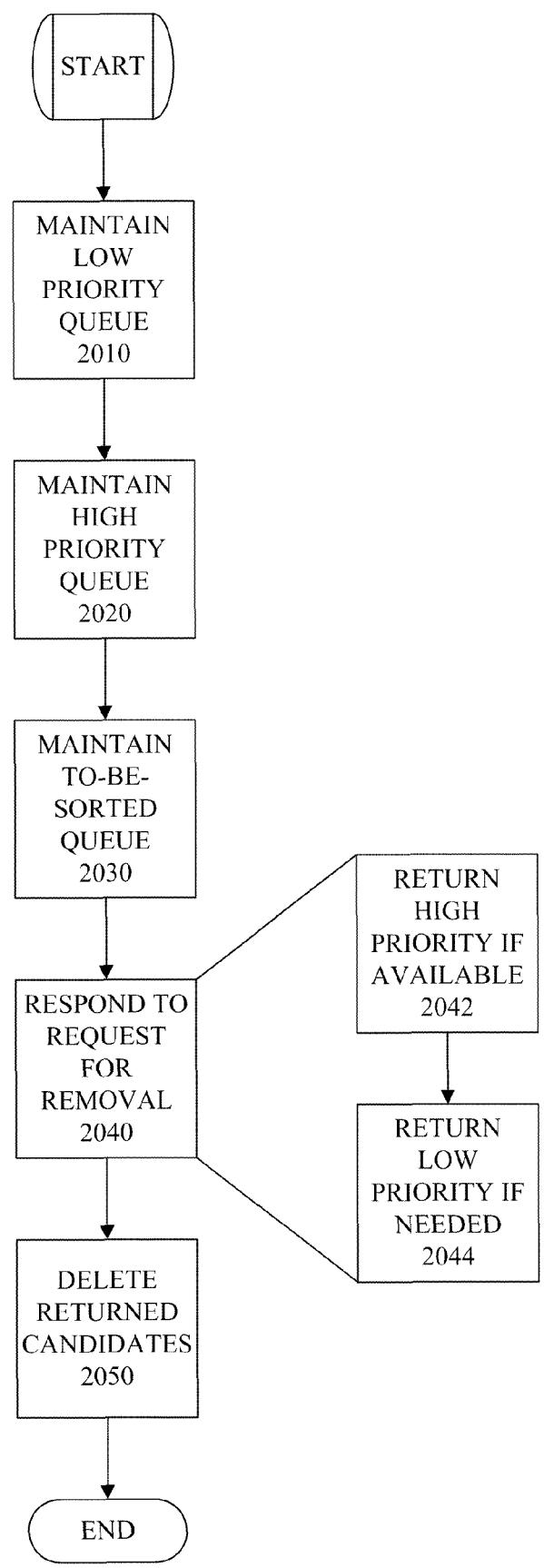
FIG. 20 is a flow diagram illustrating an eviction and expiration technique.
Figure 21:
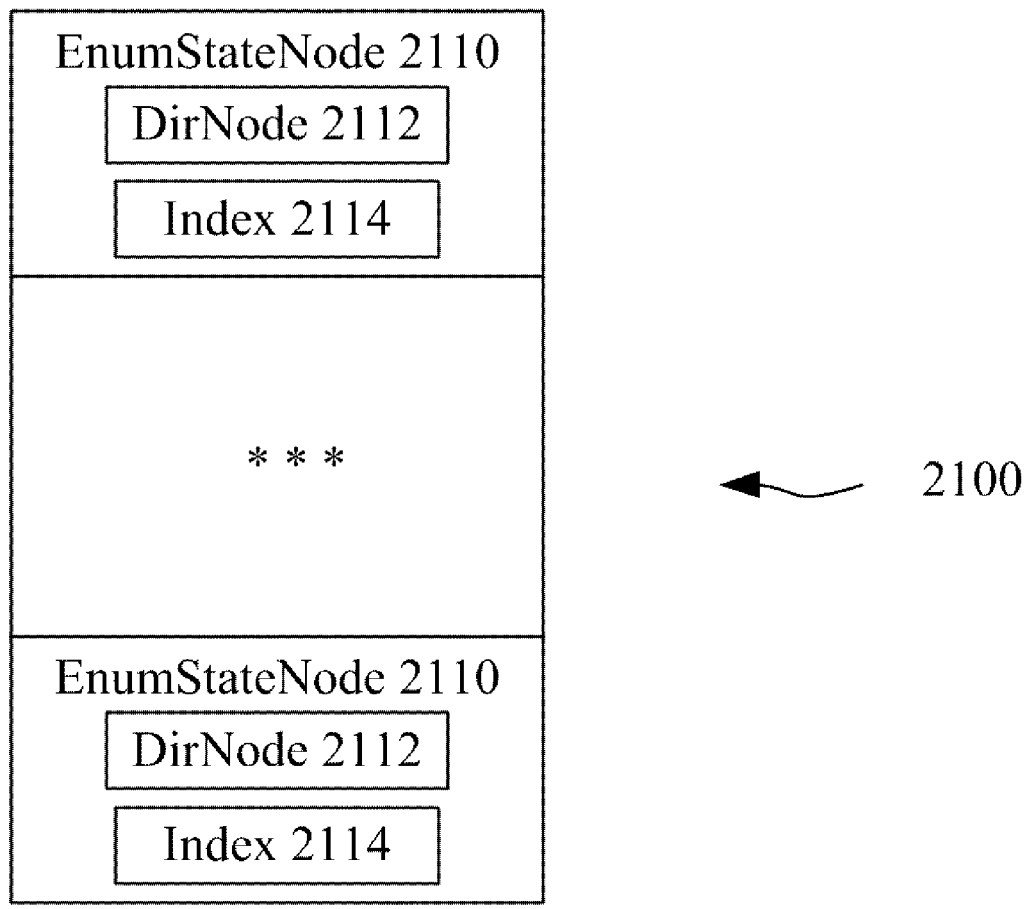
FIG. 21 is a schematic block diagram illustrating a state stack that can be used to track state during an enumeration.

Referring now to FIG. 20, an eviction and expiration technique will be discussed. In the technique, a low priority cleanup queue can be maintained (2010). The low priority queue can list low priority removal candidates to be removed from a cache, the low priority removal candidates being sorted in an order of priority for removal, such as in a least recently used priority or a least frequently used priority. A high priority cleanup queue can also be maintained (2020). The high priority cleanup queue can list high priority removal candidates to be removed from the cache, such as candidates that are identified as being expired. A to-be-sorted queue can also be maintained (2030). The to-be-sorted queue can list removal candidates to be sorted in the low priority queue and/or the high priority queue. A request for removal can be responded to (2040). Responding (2040) can include returning (2042) one or more removal candidates from the high priority cleanup queue if the high priority cleanup queue lists any high priority removal candidates. Responding (2040) can also include returning (2044) one or more low priority removal candidates from the low priority cleanup queue if no more high priority removal candidates remain in the high priority cleanup queue. The low priority removal candidates can be returned in an order of priority for removal. In addition, the returned candidates can be deleted (2050), such as in an order in which the candidates are returned.

Maintaining the low priority cleanup queue, the high priority cleanup queue, and the to-be-sorted queue can be done by listing new removal candidates in the to-be-sorted queue, identifying in the low priority cleanup queue and the to-be-sorted queue eligible candidates for listing in the high priority queue, moving the eligible candidates to the high priority queue, sorting the removal candidates in the to-be-sorted queue, and merging the candidates in the to-be-sorted queue with the low priority candidates in the low priority queue.

E. Enumeration

It can be useful for a cache to be efficient and scalable in terms of enumeration of the cache contents, especially if the contents are sent out of a cache server to cache clients. Typical cache server enumerations, which maintain state on the server side and do not do bulk operations, cannot be easily scaled. As used herein, an enumeration of a cache is a listing of all or part of the cache contents in an ordered manner. For example, this can include returning a cache unit, receiving a get next request and returning the next cache unit, etc. Enumeration can be done by traversing a lookup data structure, such as a hash table, that is used for accessing a cache. However, it can be difficult for a server interacting with numerous clients to maintain the state of each enumeration.

1. Stateful Enumerator

In one enumerator embodiment, an enumerator is implemented using traversal, such as depth first traversal of a cache lookup data structure, such as a multi-directory hash table. Referring to FIG. 20, a state of an enumeration can be maintained using a state stack (2100) of state nodes (EnumStateNode) (2110), with each EnumStateNode (2110) including the following information: directory node (DirNode) (2112), and index of last returned item (Index) (2114). DirNode (2112) can include a pointer to a corresponding directory node in the cache lookup data structure that is being traversed, and Index (2114) can indicate the index (or offset) under traversal in that directory node.

Each time the traversal extends another level deeper into the lookup data structure, a new EnumStateNode (2110) can be created and pushed onto the top of the state stack (2100). Thus, the EnumStateNode (2110) at the top of the stack can include a DirNode (2112) pointing to the current directory node under traversal and an Index (2114) indicating where the next traversal should start. When the traversal exhausts a directory node (and all child nodes of that directory node) in the lookup data structure and ascends up a level to a parent directory node, the EnumStateNode (2110) corresponding to the exhausted directory node can be discarded, leaving EnumStateNode (2110) corresponding to the parent directory node at the top of the state stack. Every GetNext operation can pop the EnumStateNode (2110) from the top of the state stack (2100) and start traversal from the directory node indicated by DirNode (2112) in that EnumStateNode (2110). Once the enumerator has located the next object node, the enumerator can push the EnumStateNode (2110) back to the top of the state stack (2100) with current directory node as DirNode (2112) and the current index+1 as Index (2114). The cache data in that next object can be returned. For example, the cache data may be returned to a cache client that sent a request for cache data by sending a GetNext request.

If directory nodes of the lookup data structure have been compacted, as discussed above, the state indicated by the state stack may no longer be valid. Hence enumerations may be invalidated by compaction.

The enumerator may be designed so that it does not deal with concurrent GetNext calls and is not shared for concurrent operations. However, if users desire to share such an enumerator across threads, then user-level concurrency control primitives could be used for GetNext access.

Figure 22:
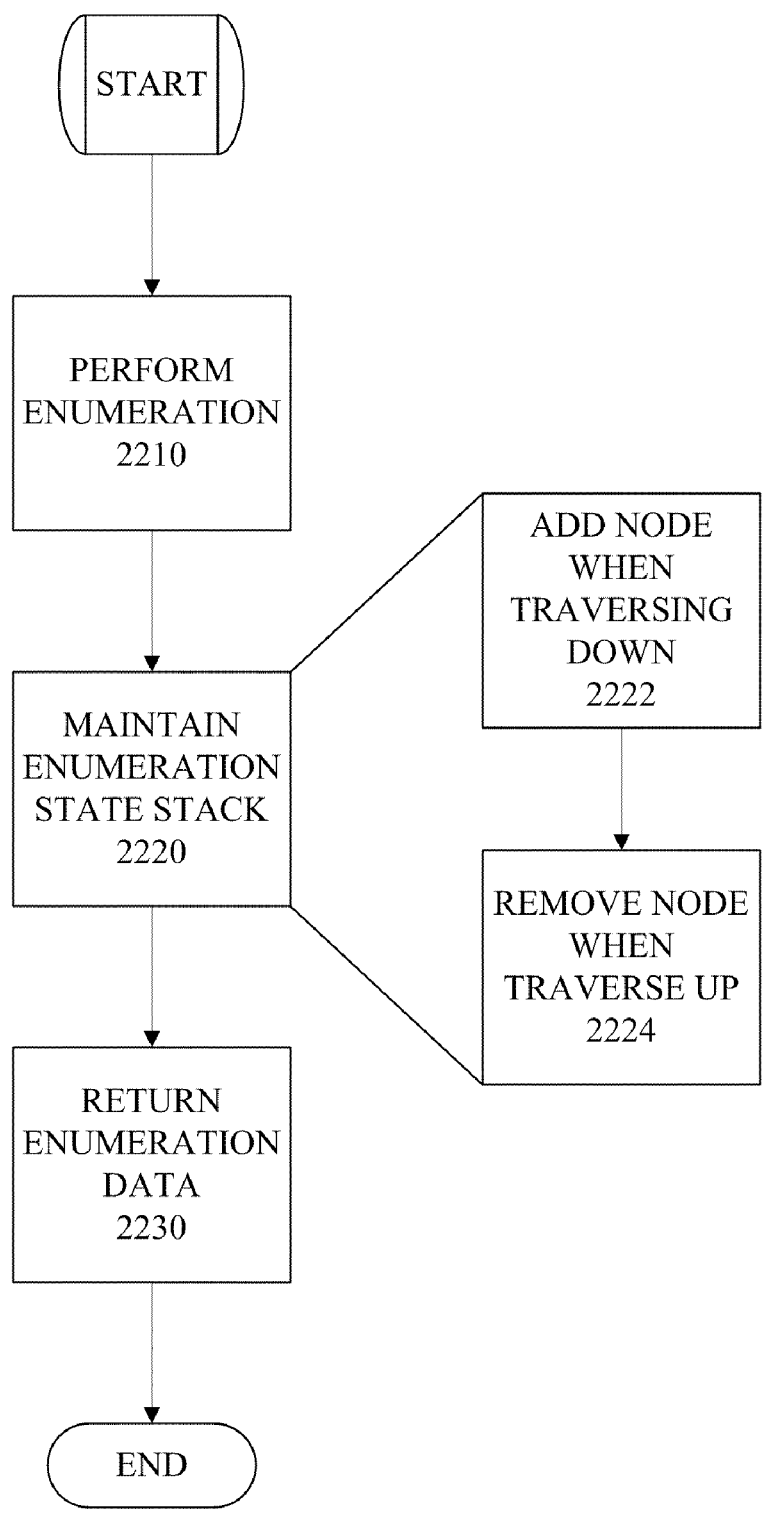
FIG. 22 is a flow diagram illustrating a stateful enumeration technique.

Referring now to FIG. 22, a stateful enumeration technique will be discussed. In the technique, in response to receiving a cache data request, such as a GetNext request, an enumeration of cache units can be performed (2210), such as by traversing a multi-level cache lookup data structure. The data structure can include internal nodes and object nodes, with the object nodes corresponding to the cache units.

In addition, an enumeration state stack can be maintained (2220). The state stack can include state nodes, and can indicate a current state of the enumeration. For example, each state node can include a node identifier and a state index, as discussed above. The state nodes can correspond to a set of the internal nodes in the data structure, with the set of internal nodes forming a path from an internal node under traversal in the data structure to an internal root node in the data structure. Maintaining (2220) the state stack can include adding (2222) a state node to the state stack when traversing down a level in the data structure as part of the enumeration. Maintaining (2220) the state stack can also include removing (2224) a state node from the state stack when traversing up a level in the data structure as part of the enumeration.

The technique can also include returning (2230) cache data located in the enumeration. The cache data could include various types of data, such as a cache unit or a batch of cache units.

2. Stateless Enumerator

In another enumerator embodiment, a stateless batch enumerator can be useful in networked environments such as client-server environments. A cache server can expose a batch application programming interface (API), which can return a batch of data objects, and a client can enumerate on that batch. Once that batch is exhausted, the client can ask for a next batch from the server. The batch API can also be configured to send a current state of the enumeration between the server and client. For example, each time a client requests a batch, the client can send the state of the enumeration to the server along with the batch request. When the server returns the next batch, it can send an updated state of enumeration, which the client can store until the client requests the next batch of cache data.

Accordingly, enumeration can be done without maintaining the state of the enumeration on the server. This can save memory on the server, especially when the server is concurrently dealing with a large numbers of client enumerations.

Moreover, the batching can save resources because the client can cache each batch and does not need to call the enumerator on the server every time a GetNext command is received. Instead, the client can retrieve the data from the pre-fetched data in the batch.

Figure 23:
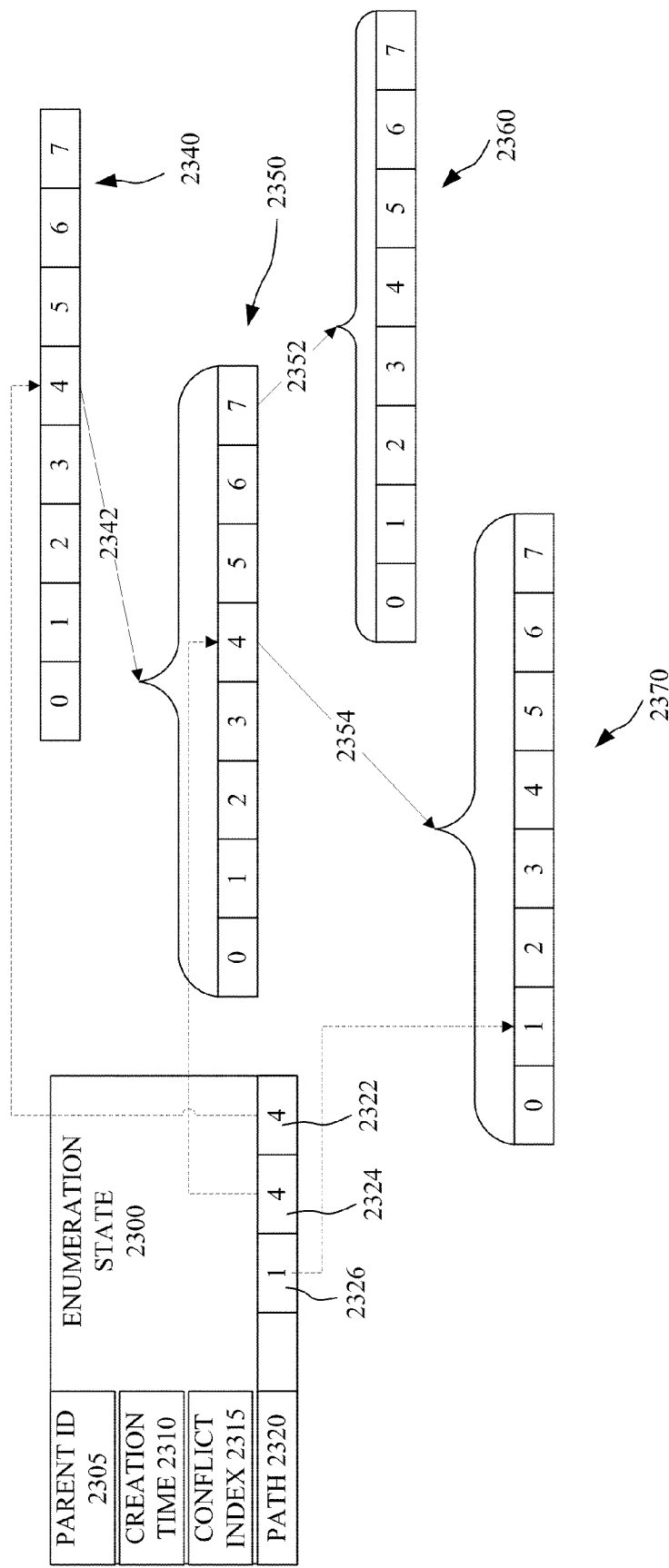
FIG. 23 is a schematic block diagram illustrating the use of an enumeration state object to track the state of an enumeration of a multi-directory lookup data structure.

As discussed above, the stateful enumerator can maintain a state stack, which can indicate a current state of enumeration over directory and conflict nodes. Referring to FIG. 23, the same state can be maintained in an enumeration state object (2300). The enumeration state object (2300) can include a parent identifier (2305), which can be used to store an identifier such as a hash code of a parent hash table to check whether the batch request is called on the correct cache lookup data structure (such as the correct hash table). The enumeration state object (2300) can also include a creation time (2310), which can be compared with compaction times for the cache lookup data structure to determine whether any compactions invalidate the enumeration.

In addition, the enumeration state object (2300) can include a conflict index (2315) and a path (2320), which can each be an unsigned integer variable. The path (2320) indicate a current state of the enumeration and can thereby assist in locating a slot to be visited next in the traversal for the enumeration, and the conflict index (2315) can provide a current index in a conflict node if the enumeration is currently traversing a conflict node. For an object node, the conflict index (2315) can be null or zero.

Still referring to FIG. 23, the path (2320) can include multiple portions (2322, 2324, and 2326), each of which can provide an offset for a specified item in a directory, so that the overall path can specify a specific slot, such as the next slot after the slot pointing to the last object returned in the last batch sent to the client. For example, as shown in FIG. 23, a first portion (2322) of the path (2320) can be four, indicating slot 4 in a root directory (2340), which can include a pointer (2342) pointing to a subdirectory (2350), which can include a pointer (2352) to one subdirectory (2360) and another pointer (2354) to another subdirectory (2370). A second portion (2324) of the path (2320) can indicate slot 4 in the subdirectory (2350), which can indicate a subdirectory (2370) pointed to by the pointer (2354) in slot 4. The third and final portion (2326) of the path (2320) can indicate slot 1 of the subdirectory (2370), which can indicate a current slot for the enumeration, such as where slot 1 is the slot for the traversal to resume for the enumeration. If slot 1 of the subdirectory (2370) were to point to a conflict node, then the conflict index (2315) could indicate an index in the conflict node where the traversal is to resume.

As noted above, a state object (2300) can be sent to a cache client with each batch of cache data from the enumeration. Each time the client requests data, the client can send the state object (2300) along with the request. Accordingly, the enumeration can proceed without maintaining the state of the enumeration on the server.

Figure 24:
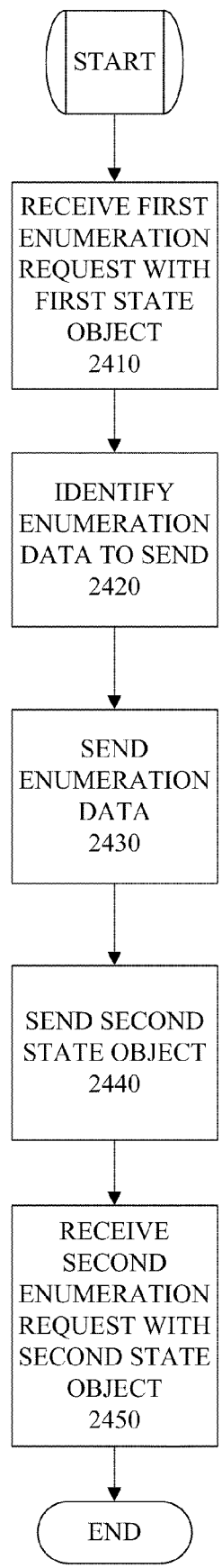
FIG. 24 is a flow diagram of a stateless enumeration technique.

Referring now to FIG. 24, a first enumeration request with a first state object can be received (2410) at an enumerator, such as where the enumerator is at a cache server and receives the first enumeration request from a cache client. The first enumeration request can request cache data from a cache, and the first state object can indicate a state of an enumeration of the cache. Cache data to be sent in response to the request can be identified (2420) using the first state object, and the identified data can be sent (2430). Identifying (2420) the cache data to send using the first state object can include traversing a data structure that points to object nodes corresponding to cache units in the cache. The data structure can be a multi-level hash table data structure that includes internal nodes and object nodes, where one of the internal nodes points to each object node.

Moreover, a second state object can be sent (2440) with the cache data in response to the first request, and a second enumeration request with the second state object can be received (2450), such as at an enumerator in a cache server. Accordingly, the enumeration can proceed without the state of the enumeration being maintained at the enumerator or elsewhere in the cache server.

F. Indexing

It can be useful for a cache data manager to support efficient creation and maintenance of indexes for performing lookups or searching on secondary values, such as tags. In one embodiment, an index data structure can be used for such lookups or searching. This index data structure can be in addition to the main lookup data structure discussed above, which can include location information corresponding to the cache units and can be managed by the data manager.

The index data structure can be a multi-level hash table structure, which can be used for implementing an index system with composite keys being used as indices for searching a cache, such as a distributed partitioned cache. The indices can be managed with the cache data manager component.

In the indexing hash table structure, one or more internal hash tables, including a root hash table, can point to lower level hash tables, which can in turn point to other even lower level hash tables. In an n-level hash table structure, each leaf node for the ith level hash table can point to the (i−1) level hash table or to a cache unit. Operations on the multilevel hash table structure can be done using composite keys, where a composite key is an ordered set of sub-keys, such as an ordered set of hash keys. Each hash table can include a single directory or multiple directories. For an n-level hash table structure, a composite key may include up to n sub-keys. The sub-keys within the composite key can be specified in a consistent order for all operations on the multi-level hash table structure. In other words, if an object is added to the multi-level hash table structure with a composite key $\{k\_1, k\_2, k\_3, \ldots k\_n\}$, then to access the object, the same composite key can be used with the same order of the keys. In addition, an ith-level hash table that points to an object of interest within the multi-level hash table structure could be accessed using the first (n−i) keys in the composite key $\{k\_1, k\_2, k\_3 \ldots k\_n\}$ with the same order of the keys.

Figure 25:
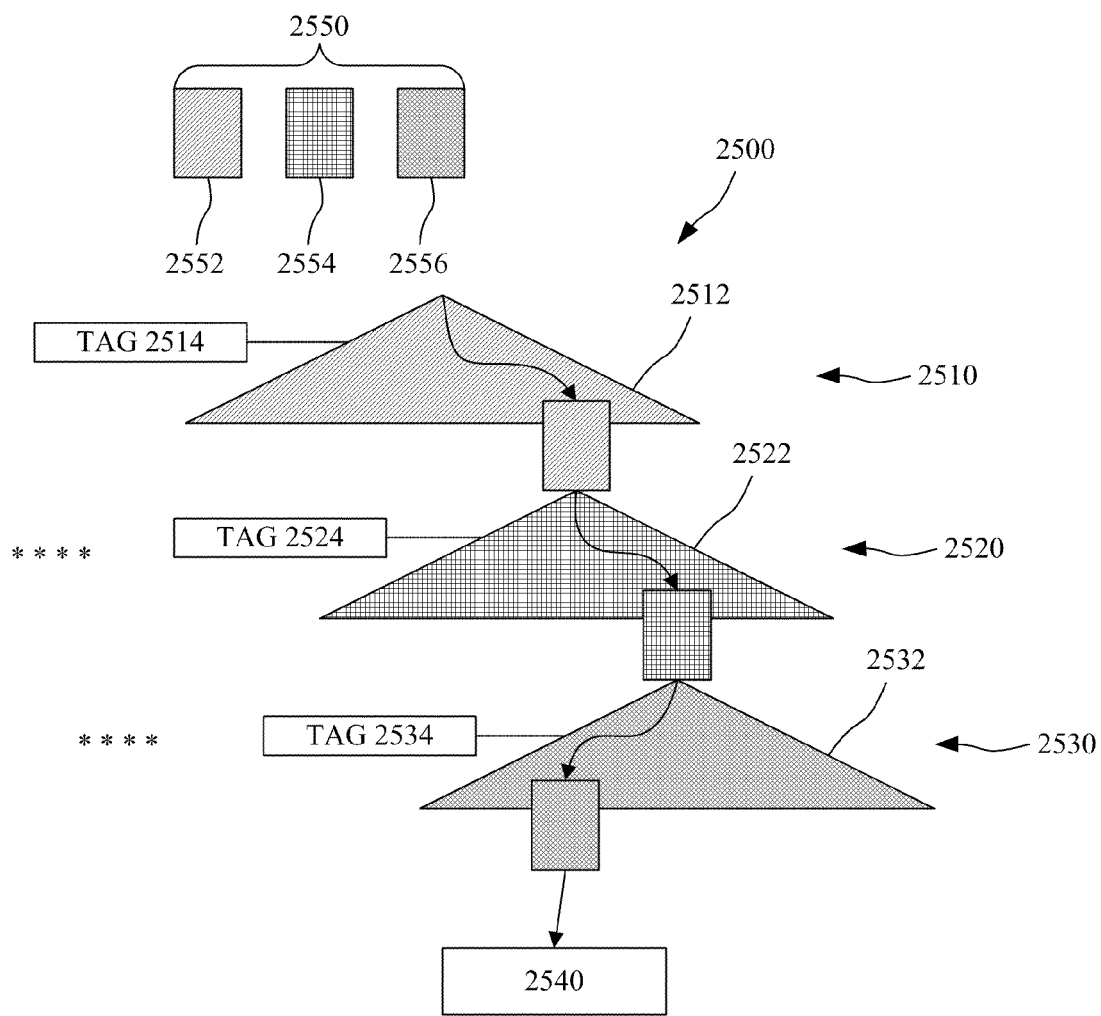
FIG. 25 is a schematic diagram illustrating an example of a three-level hash table structure.

Referring to FIG. 25, an example of a three-level hash table structure (2500) will be discussed. The table structure (2500) can include a third level (2510) including a root hash table (2512) associated with a tag (2514) (e.g. a tag for "Books"), a second level (2520) including one or more sub-tables including a table (2522) associated with a tag (2524) (e.g., a tag for "Fiction"), and a first level (2530) including one or more sub-tables including a table (2532) associated with a tag (2534) (e.g., a tag for "Romance Novels").

An object (2540), such as a cache object associated with a particular book, pointed to by a leaf node of the hash table (2532) in the first level (2530) can be specified with a composite key (2550) having three ordered hash keys (2552, 2554, and 2556). A first hash key (2552) in the composite key (2550) can specify a pointer in a leaf node of the root hash table (2512), where the pointer points to the hash table (2522) in the second level (2520). A second hash key (2554) in the composite key (2550) can specify a pointer in a leaf node in the second-level hash table (2522), where that pointer points to the leaf hash table (2532) in the first level (2530). A third hash key (2556) in the composite key (2550) can specify a pointer in a leaf node in the first-level hash table (2532), which can point to the specified object (2540), such as a cache unit. Accordingly, the hash table structure (2500) in FIG. 25 can be considered a tree data structure, with the tables in the hash table structure (2500) being nodes in the tree structure.

A tag index can be formed using the multiple level hash table structure (2500), where a tag (2514, 2524, 2534, etc.) can be associated with each hash table. Objects pointed to by a hash table or its sub-tables can be considered to correspond to a tag associated with the hash table.

Moreover, an index enumerator can maintain a list of one or more intermediate level hash table enumerator states and a leaf hash table enumerator state (current state). When a client asks for a batch with an index enumerator state, the enumerator can traverse over the list of state to locate a leaf hash table. Once the leaf hash table is located, a batch can be requested for that leaf hash table with the current enumeration state, such as by using the stateful or stateless enumeration techniques discussed above.

Accordingly, the multi-level hash table structure can be used to search for cache units associated with one or more tags. For example, if a root hash table was tagged for books and a sub-table was tagged for fiction, a search for fiction books could be performed by enumerating and returning all the book objects pointed to (either directly or indirectly such as through one or more sub-tables) by that sub-table.

Figure 26:
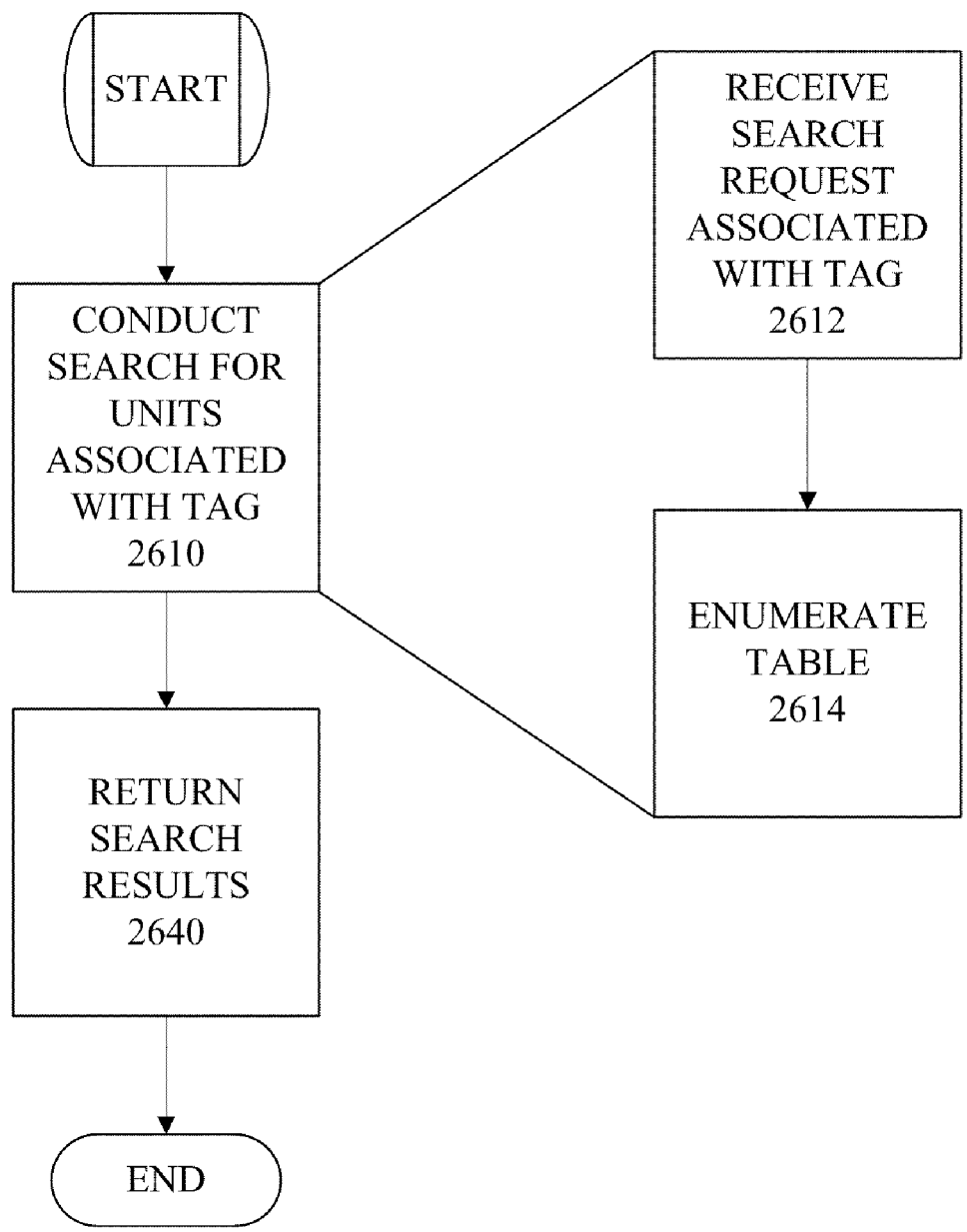
FIG. 26 is a flow diagram illustrating an index searching technique using tags associated with index tables.

Referring now to FIG. 26, an indexing technique will be discussed. The technique can be performed in a computing environment that includes a cache, such as a distributed partitioned cache, and that includes a main cache lookup data structure that includes location information corresponding to the cache units in the cache. The environment can also include a cache index data structure, such as the one illustrated in FIG. 25, with a higher level table and a lower level table, the higher level table having a leaf node pointing to the lower level table, and the lower level table having a leaf node pointing to one of the cache units. In addition, the lower level table can be associated with a tag. Alternatively, the technique can be performed in some other environment.

The technique can include conducting a search (2610) for cache units associated with a tag, which can be associated with a cache table in a cache index data structure. The search (2610) can be conducted using the cache index data structure. For example, a search request associated with the tag can be received (2612). In response to the request, a table in the data structure, such as the lower-level table discussed above, can be enumerated (2614). The enumeration can include enumerating (2614) the table associated with the tag (such as by enumerating cache units or objects that nodes in the table point to) and enumerating other tables in the data structure that are pointed to by the table associated with the tag. Conducting the search can include using a key to access one or more cache units pointed to by one or more tables in the cache index data structure. The key can be a composite key that includes an ordered set of sub-keys, with each sub-key including location information (e.g., in the form of a hash key) for a table in the cache index data structure.

In addition, results from the search, such as a list of cache units from the enumeration or the cache units themselves, can be returned (2640).

Although the subject matter has been described in language specific to structural features and/or methodological acts, it is to be understood that the subject matter defined in the appended claims is not necessarily limited to the specific features or acts described above. For example, the acts and features may be beneficially used with a cache that is not a distributed cache. Rather, the specific features and acts described above are disclosed as example forms of implementing the claims.

We claim:

1. One or more computer-readable storage media not consisting of a propagated signal, the one or more computer-readable storage media having computer-executable instructions embodied thereon that, when executed, perform acts comprising:

using a first portion of a first identifier to assign the first identifier to a slot in a first directory, the first identifier identifying a first cache unit in a cache;

determining whether assignment of the first identifier to the slot in the first directory will result in the first identifier and one or more other identifiers being assigned to the same slot in the first directory; and if assigning the first identifier to the slot in the first directory will result in the first identifier and one or more other identifiers being assigned to the same slot in the first directory, then:

using a second portion of the first identifier to assign the first identifier to a slot in a second directory; and assigning the one or more other identifiers to one or more slots in the second directory.

2. The one or more computer-readable media of claim 1, wherein the acts further comprise determining whether the first identifier is the same as one or more of the other identifiers, and if the first identifier is the same as one or more of the other identifiers, then assigning the first identifier and the one or more other identifiers that are the same as the first identifier to a conflict node that points to cache items corresponding to the first identifier and the one or more other identifiers that are the same as the first identifier.

3. The one or more computer-readable media of claim 1, wherein the first identifier and the one or more other identifiers are hash keys, and the first directory and the second directory are part of a multi-directory hash table.

4. The one or more computer-readable media of claim 1, wherein determining whether the one or more other identifiers is assigned to the same slot in the first directory comprises determining whether the slot in the first directory holds a pointer to another directory, and wherein the acts further comprise, if the slot in the first directory does not hold a pointer to another directory and if assigning the first identifier to the slot in the first directory will result in the first identifier and one or more other identifiers being assigned to the same slot in the first directory, then inserting a pointer to the second directory in the slot in the first directory.

5. The one or more computer-readable media of claim 4, wherein the acts further comprise, if the slot in the first directory does not hold a pointer to another directory, then creating the second directory.

6. The one or more computer-readable media of claim 1, wherein determining whether the one or more other identifiers is assigned to the same slot in the first directory comprises determining whether the slot in the first directory holds a pointer to another directory, and wherein the acts further comprise, if the slot in the first directory holds a pointer to another directory, then using the other directory as the second directory.

7. The one or more computer-readable media of claim 1, wherein:

the cache is a distributed partitioned cache;

the first identifier and the one or more other identifiers are hash keys;

the first directory and the second directory are part of a multi-directory hash table;

determining whether the one or more other identifiers is assigned to the same slot in the first directory comprises determining whether the slot in the first directory holds a pointer to another directory; and the acts further comprise, if assigning the first identifier to the slot in the first directory will result in the first identifier and one or more other identifiers being assigned to the same slot in the first directory, then:

if the slot in the first directory does hold a pointer to another directory, then using the other directory as the second directory; and if the slot in the first directory does not hold a pointer to another directory, then creating the second directory and inserting a pointer to the second directory in the slot in the first directory.

8. A computer-implemented method, comprising:

using a first portion of a first identifier to assign the first identifier to a slot in a first directory of a cache lookup data structure, the first identifier identifying a first cache unit in a cache;

using a first portion of a second identifier to assign the second identifier to a slot in the first directory, the second identifier identifying a second cache unit in the cache;

determining whether the first identifier and the second identifier are assigned to the same slot in the first directory; and if the first identifier and the second identifier are assigned to the same slot in the first directory, then:

using a second portion of the first identifier to assign the first identifier to a slot in a second directory of the cache lookup data structure; and using a second portion of the second identifier to assign the second identifier to a slot in the second directory.

9. The method of claim 8, further comprising:

determining whether the first identifier and the second identifier are assigned to the same slot in the second directory;

if the first identifier and the second identifier are assigned to the same slot in the second directory, then:

using a third portion of the first identifier to assign the first identifier to a slot in a third directory; and using a third portion of the second identifier to assign the second identifier to a slot in the third directory.

10. The method of claim 8, wherein the second portion of the first identifier and the second portion of the second identifier are indicated by a mask.

11. The method of claim 8, wherein the first identifier and the second identifier are hash keys.

12. The method of claim 8, wherein:

the first portion of the first identifier is a first number of least significant bits in the first identifier;

the first portion of the second identifier is the first number of least significant bits in the second identifier;

the second portion of the first identifier is a second number of least significant bits following the first number of least significant bits in the first identifier; and the second portion of the second identifier is the second number of least significant bits following the first number of least significant bits in the second identifier.

13. The method of claim 8, wherein the first directory and the second directory each comprise an array of one or more slots, and wherein each of the one or more slots is configured to hold a pointer.

14. The method of claim 8, further comprising, if the first identifier and the second identifier are assigned to the same slot in the first directory, then inserting a pointer pointing to the second directory in that same slot.

15. A computer system comprising:

a multi-directory data structure comprising a plurality of directories including a root directory and one or more lower directories below the root directory, wherein the plurality of directories each comprise one or more pointers pointing to another directory or to one or more cache units in a cache, at least one of the directories comprising a pointer pointing to a cache unit in the cache;

at least one processor; and memory comprising instructions stored thereon that when executed by at least one processor cause at least one processor to perform acts comprising:

determining whether a subject directory of the plurality of directories includes more than one pointer, the subject directory being pointed to by a parent pointer in a parent slot in a parent directory above the subject directory;

removing the parent pointer from the parent slot if the subject directory does not include more than one pointer; and retaining the parent pointer in the parent slot if the subject directory does include more than one pointer.

16. The computer system of claim 15, wherein determining comprises determining whether the subject directory includes only one pointer, and wherein removing the parent pointer comprises replacing the parent pointer with the one pointer if the subject directory includes only the one pointer.

17. The computer system of claim 15, wherein determining comprises determining whether the subject directory does not include any pointers, and wherein removing the parent pointer comprises removing the parent pointer and leaving the parent slot empty if the subject directory does not include any pointers.

18. The computer system of claim 15, wherein determining comprises performing a first count of non-empty slots in the subject directory, replacing the parent pointer in the parent slot with a self-pointer that points to itself, and performing a second count of non-empty slots in the subject directory.

19. The computer system of claim 18, wherein removing the parent pointer comprises removing the parent pointer only if the first count is not more than one and the second count is not more than one.

20. The computer system of claim 15, wherein the cache is a distributed partitioned cache and the data structure is a hash table.

* * * * *